US007778506B2

(12) United States Patent
Daneshmand et al.

(10) Patent No.: US 7,778,506 B2
(45) Date of Patent: Aug. 17, 2010

(54) MULTI-PORT MONOLITHIC RF MEMS SWITCHES AND SWITCH MATRICES

(76) Inventors: Mojgan Daneshmand, 704 Zurich Dr., Waterloo, ON (CA) N2V 2S8; Raafat R. Mansour, 310 Amberwood Dr., Waterloo, Ontario (CA) N2T 2G2

( * ) Notice: Subject to any disclaimer, the term of this patent is extended or adjusted under 35 U.S.C. 154(b) by 0 days.

(21) Appl. No.: 11/697,169

(22) Filed: Apr. 5, 2007

(65) Prior Publication Data

US 2007/0235299 A1 Oct. 11, 2007

Related U.S. Application Data

(60) Provisional application No. 60/789,136, filed on Apr. 5, 2006, provisional application No. 60/789,131, filed on Apr. 5, 2006.

(51) Int. Cl.
*G02B 6/42* (2006.01)

(52) U.S. Cl. ........................................ 385/22; 333/101

(58) Field of Classification Search .................. 333/20, 333/103, 204, 262; 361/179; 385/7
See application file for complete search history.

(56) References Cited

U.S. PATENT DOCUMENTS

| | | | | |
|---|---|---|---|---|
| 4,851,801 | A * | 7/1989 | Engel | 335/230 |
| 4,931,753 | A * | 6/1990 | Nelson et al. | 333/161 |
| 4,994,773 | A * | 2/1991 | Chen et al. | 333/164 |
| 4,997,245 | A * | 3/1991 | DuPuy et al. | 385/16 |
| 5,200,721 | A * | 4/1993 | Mansour | 333/202 |
| 5,498,771 | A * | 3/1996 | Mansour et al. | 505/210 |
| 5,566,263 | A * | 10/1996 | Smith et al. | 385/40 |
| 5,578,976 | A * | 11/1996 | Yao | 333/262 |
| 5,585,331 | A * | 12/1996 | Mansour et al. | 505/210 |
| 5,786,303 | A * | 7/1998 | Mansour | 505/210 |
| 5,915,051 | A * | 6/1999 | Damask et al. | 385/16 |
| 5,990,765 | A * | 11/1999 | Mansour et al. | 333/204 |
| 6,016,092 | A * | 1/2000 | Qiu et al. | 333/262 |
| 6,041,245 | A * | 3/2000 | Mansour | 505/210 |
| 6,067,461 | A * | 5/2000 | Ye et al. | 505/210 |
| 6,100,477 | A * | 8/2000 | Randall et al. | 200/181 |
| 6,229,683 | B1 * | 5/2001 | Goodwin-Johansson | 361/233 |
| 6,255,902 | B1 * | 7/2001 | Gilliland et al. | 330/9 |
| 6,263,220 | B1 * | 7/2001 | Mansour | 505/210 |
| 6,307,169 | B1 * | 10/2001 | Sun et al. | 200/181 |
| 6,320,145 | B1 * | 11/2001 | Tai et al. | 200/181 |

(Continued)

OTHER PUBLICATIONS

Daneshman et al. A novel integrated interconnect network for RF switch matrix applications. Microwave Symposium Digest, 2004 IEEE MTT-S International. vol. 2, Jun. 6-11, 2004 pp. 1213-1216.*
Daneshman et al. RF MEMS waveguide switch. Microwave Symposium Digest, 2004 IEEE MTT-S International. vol. 2, Jun. 6-11, 2004 pp. 589-592.*

(Continued)

*Primary Examiner*—Frank G Font
*Assistant Examiner*—Peter Radkowski
(74) *Attorney, Agent, or Firm*—Daryl W. Schnurr

(57) ABSTRACT

A multi-port RF MEMS switch, a switch matrix having several multi-port RF MEMS switches and an interconnect network have a monolithic structure with clamped-clamped beams, cantilever beams or thermally operated actuators. A method of fabricating a monolithic switch has clamped-clamped beams or cantilever beams.

23 Claims, 23 Drawing Sheets

U.S. PATENT DOCUMENTS

| | | | | |
|---|---|---|---|---|
| 6,366,716 | B1 * | 4/2002 | Graves | 385/17 |
| 6,393,309 | B1 * | 5/2002 | Mansour | 505/210 |
| 6,658,177 | B1 * | 12/2003 | Chertkow | 385/18 |
| 7,110,633 | B1 * | 9/2006 | Helkey et al. | 385/16 |
| 7,254,287 | B2 * | 8/2007 | Ellwood, Jr. | 385/11 |
| 2002/0027064 | A1 * | 3/2002 | York et al. | 200/181 |
| 2002/0130731 | A1 * | 9/2002 | Mansour | 333/99 S |
| 2002/0149449 | A1 * | 10/2002 | Mansour et al. | 333/219.1 |
| 2002/0159677 | A1 * | 10/2002 | Hsu et al. | 385/16 |
| 2003/0029705 | A1 * | 2/2003 | Qiu et al. | 200/181 |
| 2004/0155725 | A1 * | 8/2004 | Kwiatkowski | 333/101 |

OTHER PUBLICATIONS

Mansour et al. RF MEMS devices, Proceedings of ICMENS2003, 2003, pp. 1-5.*

Daneshman et al. RF MEMS Waveguide Switch, IEEE Trans. On Microwave Theory and Techniques, 2004, v. 52, n. 12, pp. 2651-2657.*

Yassini et al. A novel MEMS LTTCC Switch Matrix. 2004 IEEE MIT-S Digest, pp. 721-724.*

Mansour et al. RF MEMS devices, Proceedings of ICMENS 2003, 2003, pp. 1-5.*

* cited by examiner

Figure 10A
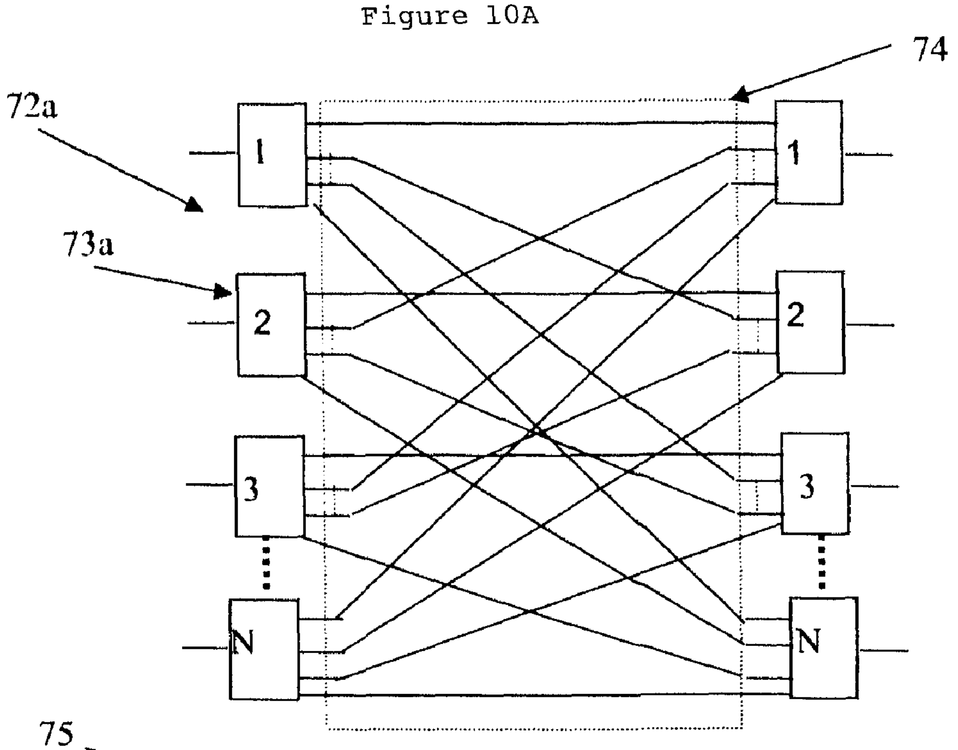
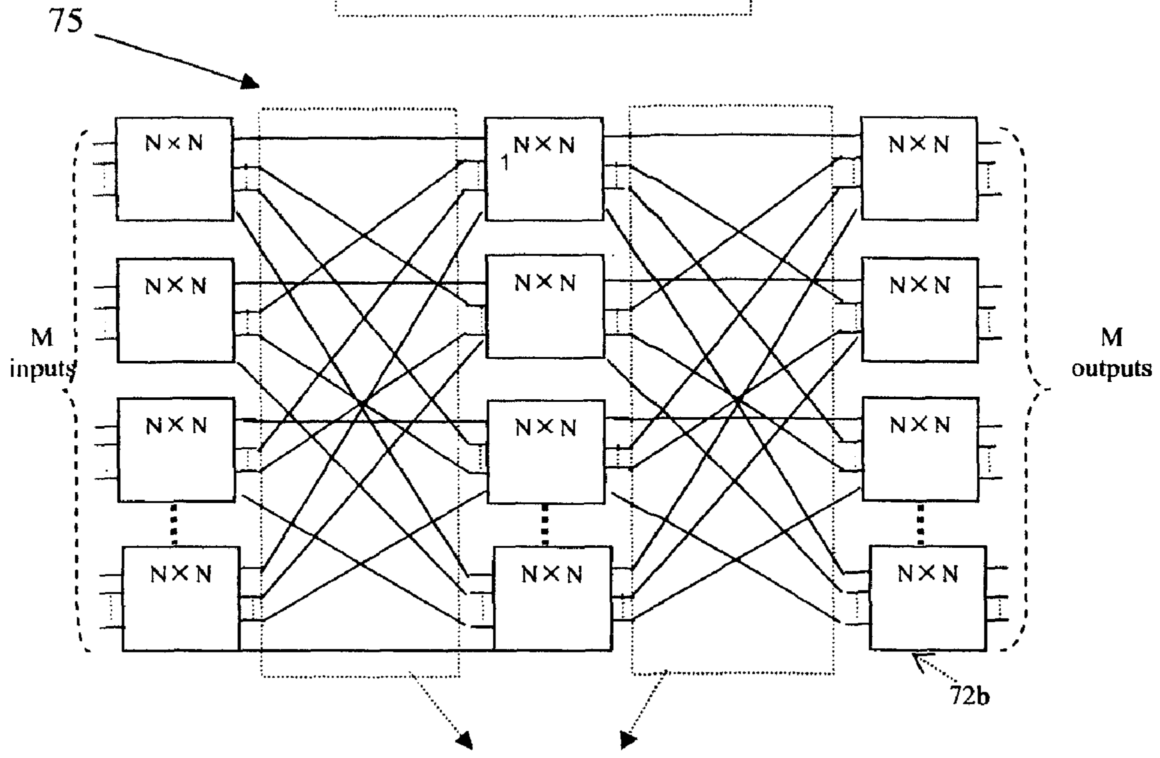
Figure 10B

Figure 11A
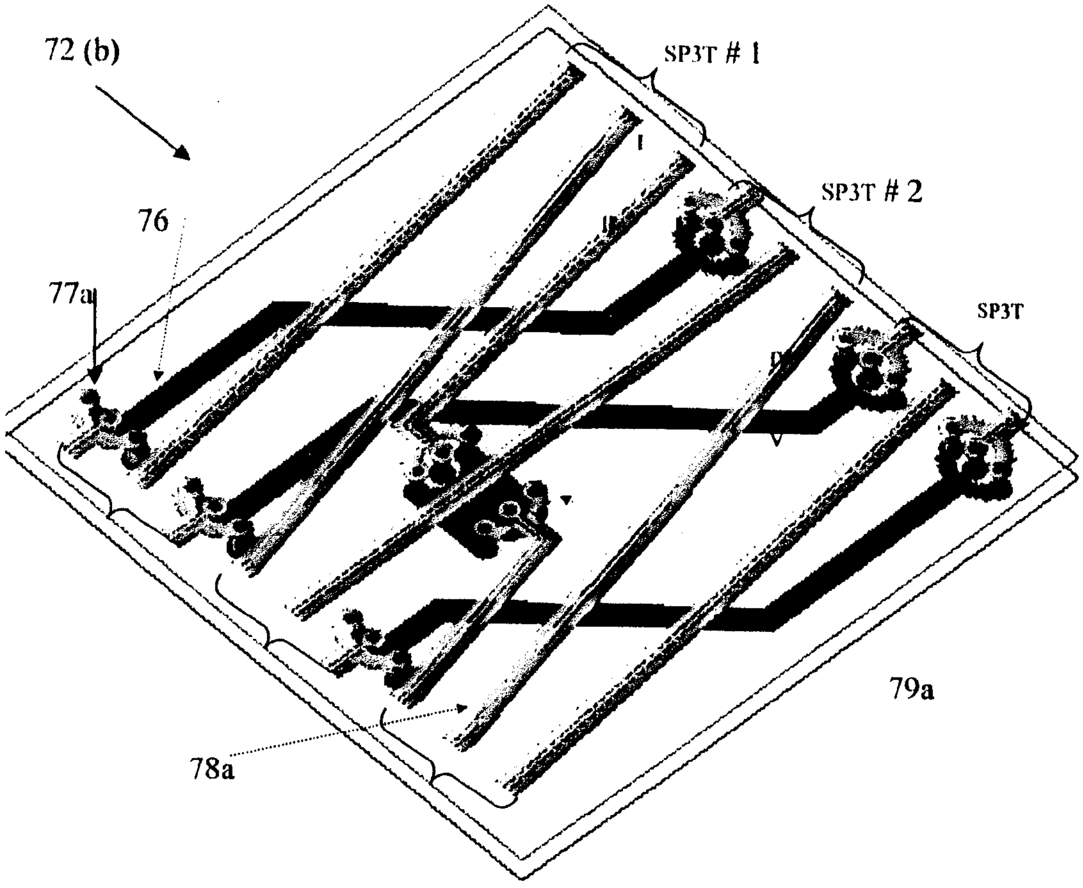
Figure 11B
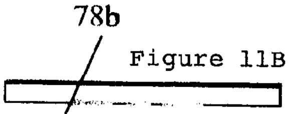
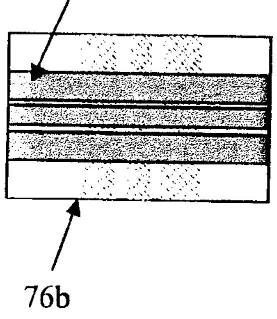
Figure 11C
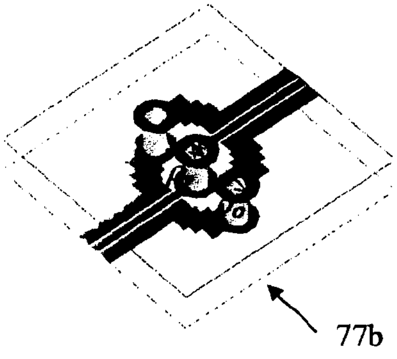
Figure 11D
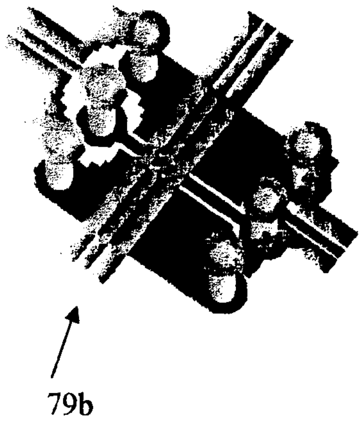
Figure 11E Figure 13A
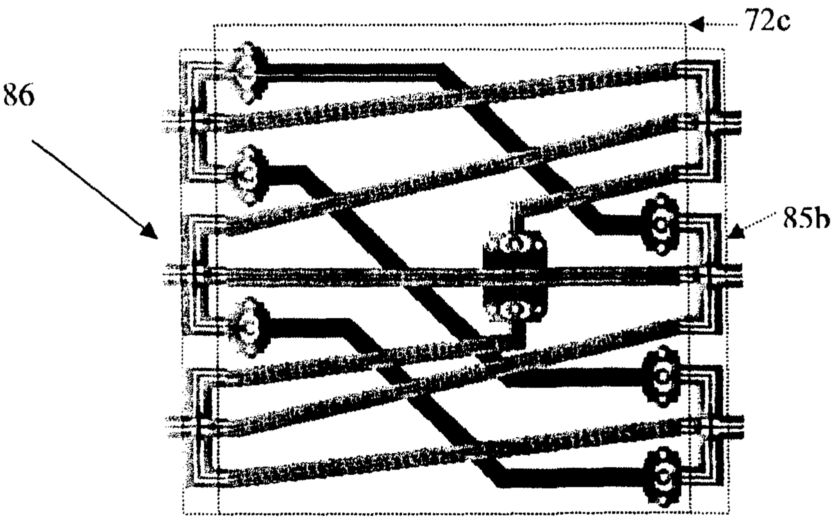
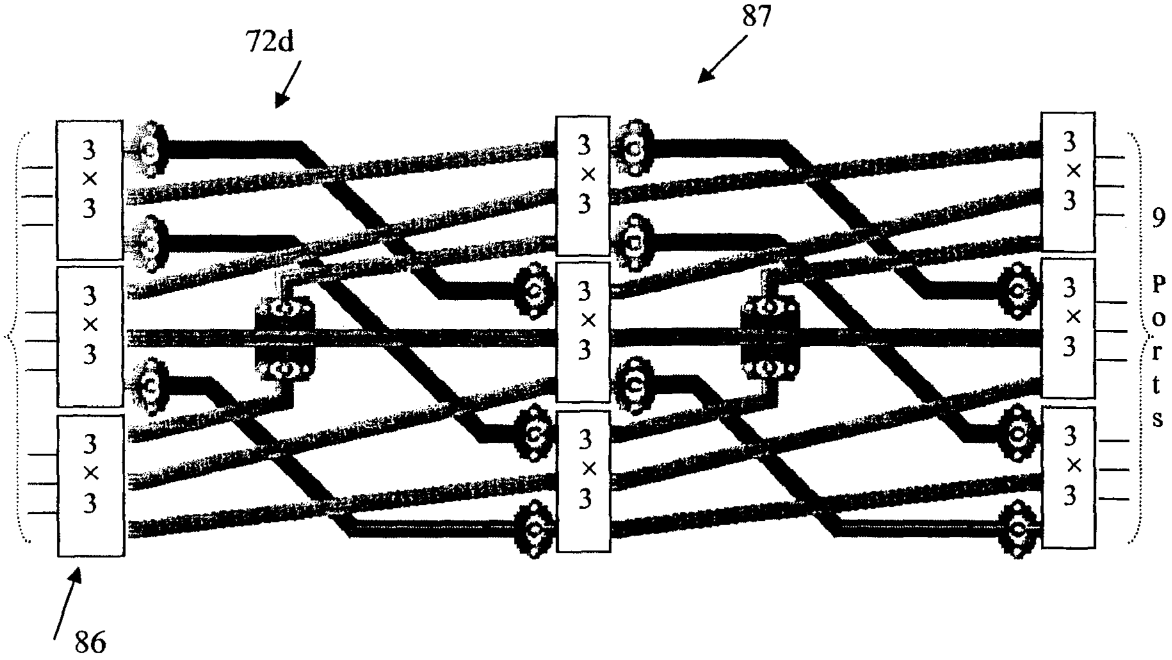
Figure 13B Figure 14A
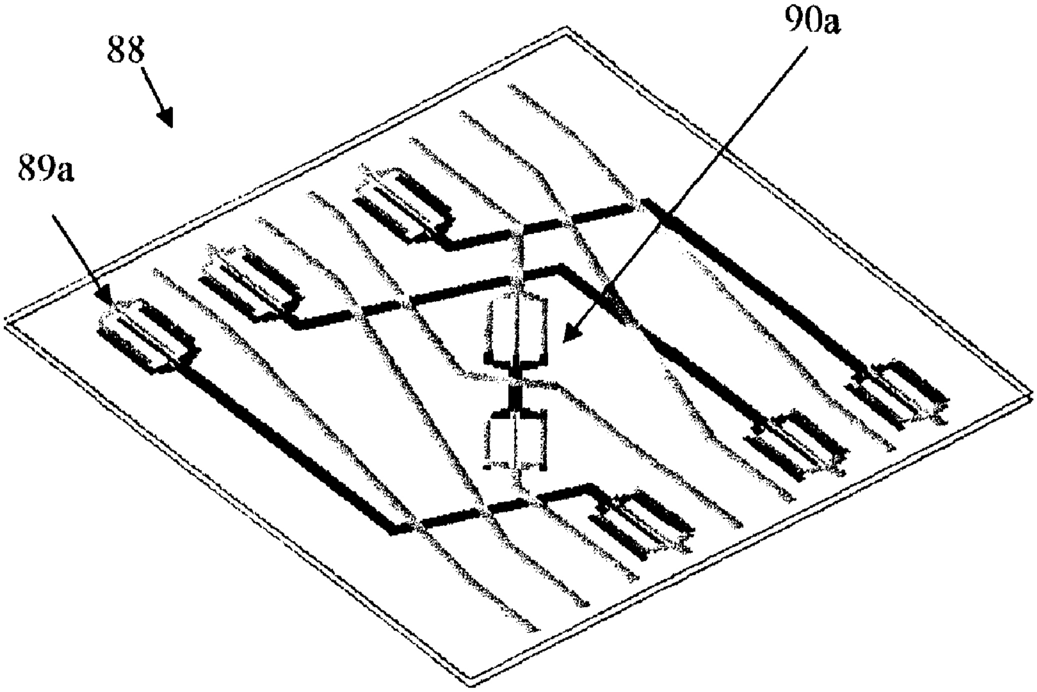
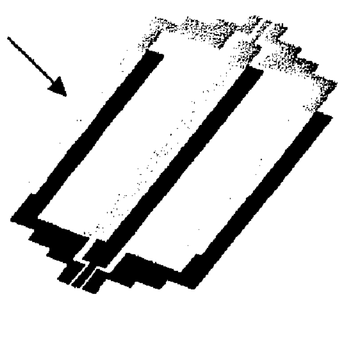
Figure 14B
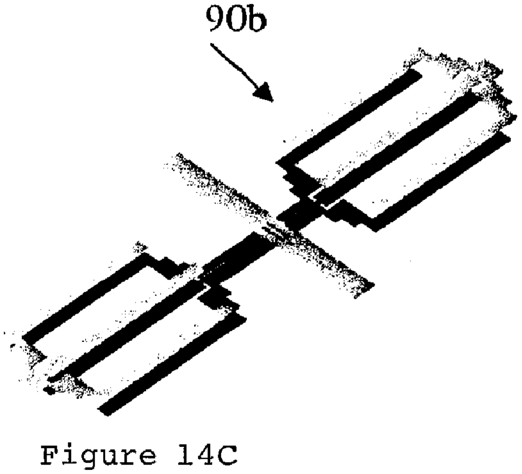
Figure 14C Figure 15A
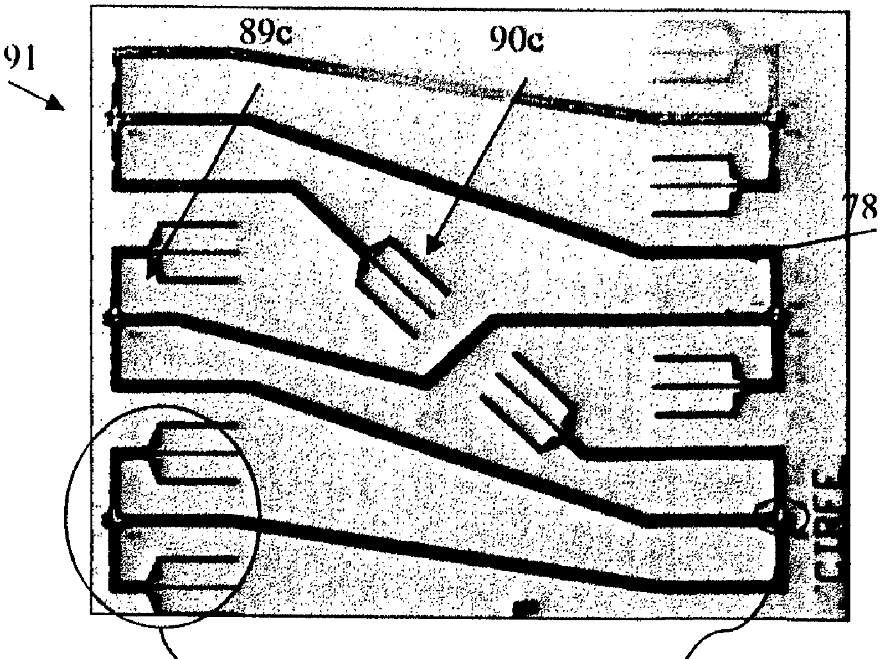
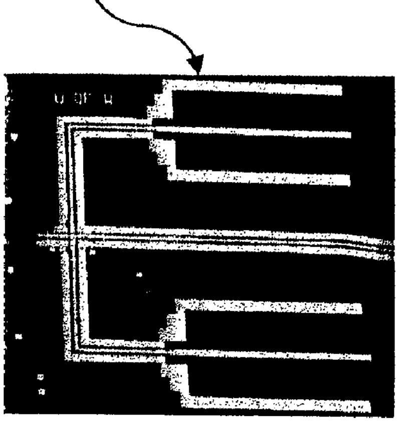
Figure 15B
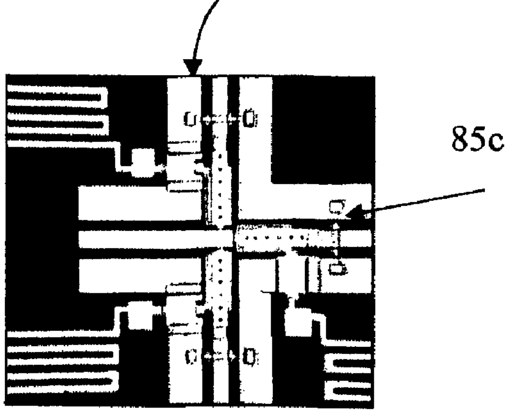
Figure 15C
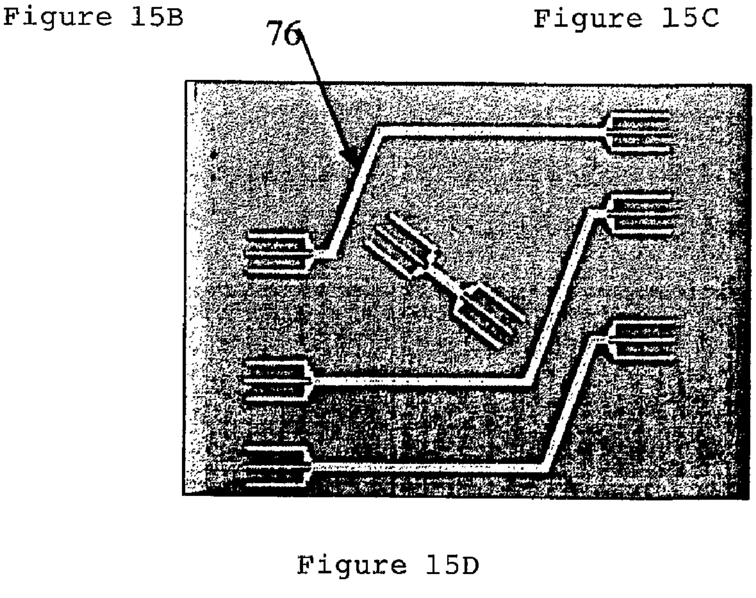
Figure 15D Figure 18A
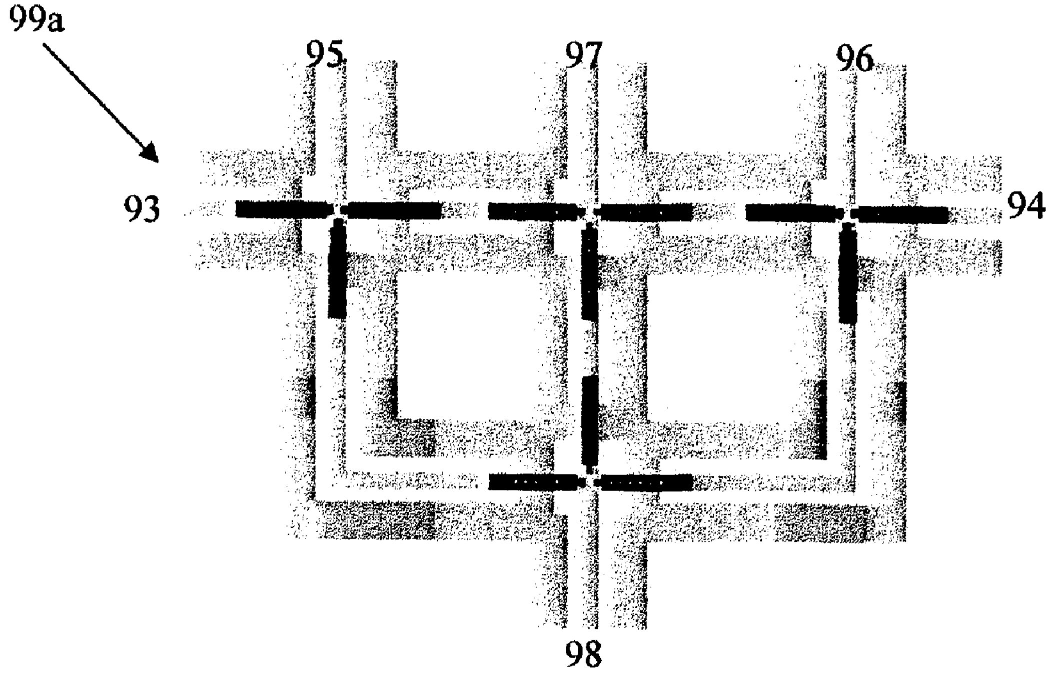
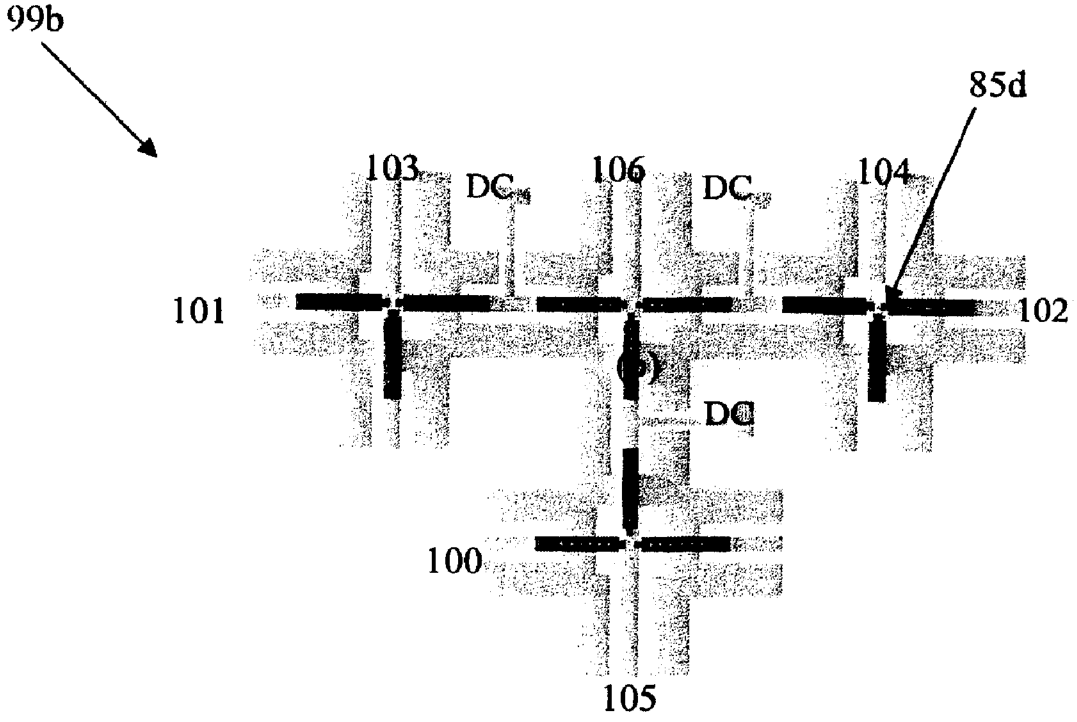
Figure 18B Figure 19A
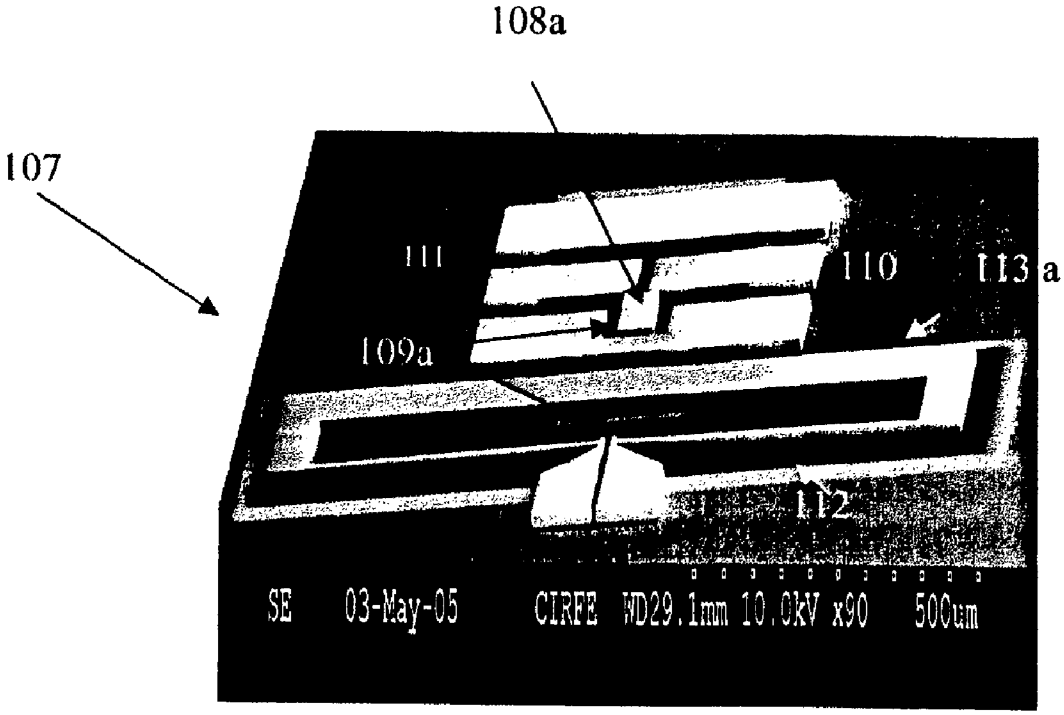
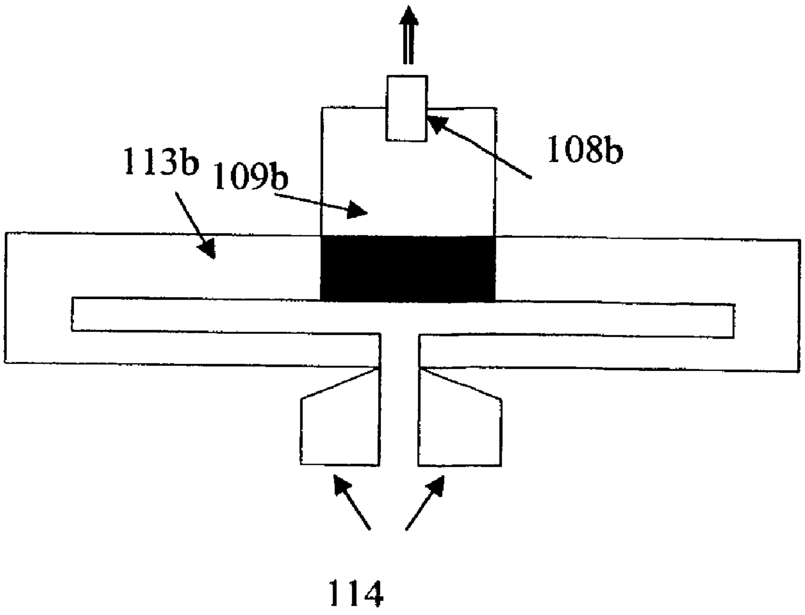
Figure 19B

MULTI-PORT MONOLITHIC RF MEMS SWITCHES AND SWITCH MATRICES

Applicant claims the benefit of U.S. Provisional Application Ser. No. 60/789,136 filed on Apr. 5, 2006 and U.S. Provisional Application Ser. No. 60/789,131 filed on Apr. 5, 2006.

BACKGROUND OF THE INVENTION

1. Field of the Invention

This invention relates to RF MEMS microwave switches, a switch matrix and a method of fabricating a monolithic switch. More particularly, this invention relates to a multi-port RF MEMS switch having a monolithic structure with clamped-clamped beams, cantilever beams or thermally operated actuators.

2. Description of the Prior Art

Satellite beam linking systems vastly rely on switch matrix functionality to manage traffic routing and for optimum utilization of system bandwidth to enhance satellite capacity. A beam link system creates sub-channels for each uplink beam where the switch matrix provides the flexibility to independently direct the beams to the desired downlink channel. Switch matrices can also provide system redundancy for both receive and transmit subsystems and improve the reliability of the systems. In case of failure of any amplifiers, the switch matrix reroutes the signal to the spare amplifier and thus the entire system remains fully functional.

The two types of switches that can be currently used in the form of switch matrices are mechanical switches and solid state switches. Mechanical (coaxial and waveguide) switches show good RF performance up to couple of hundred gigahertz. However, mechanical switches are heavy and bulky as they employ motors for the actuation mechanism. This issue is more pronounced in the form of switch matrices where hundreds of multi-port switches are integrated together. Solid state switches, on the other hand, are relatively small in size, but they show poor RF performance especially in high frequency applications (100-200 GHz) and they have DC power consumption.

SUMMARY OF THE INVENTION

RF MEMS switches are good candidates to substitute for the existing multi-port switches and switch matrices due to their good RF performance and miniaturized dimensions. However, by reducing the size and increasing the system density, signal transmission and isolation of the interconnect lines become an important issue.

The approach of the present invention provides the opportunity to implement the entire switch matrix structure on one chip and avoid hybrid integration of MEMS switches with thick-film multi-layer substrates.

The present invention proposes a method of realizing monolithic RF MEMS multi-port switches, all interconnects and switch matrices on a single layer substrate using thin film technology. Novel prototype units of C-type and R-type switches and switch matrices are demonstrated.

Novel configurations of monolithic C-type and R-type switches are demonstrated. C-type switch is a four port device with two operational states that can be used to integrate in the form of a redundancy switch matrix. An R-type switch is also a four port device that has an additional operating state compared to the C-type switch. This can considerably simplify switch matrix integration. In addition, a new technique to integrate multi-port switches in the form of switch matrices including all the interconnect lines monolithically is exhibited. These switches and switch matrices are employed for satellite and wireless communication.

An objective of the present invention is to show the feasibility of using MEMS technology to develop C-type and R-type RF MEMS switches.

It is also another objective to provision a technique that monolithically integrates multi-port RF MEMS switches with interconnect lines in the form of switch matrices over a single substrate.

A multi-port RF MEMS switch comprises a monolithic structure formed on a single substrate. The switch has at least one of clamped-clamped beams and cantilever beams. The switch has two connecting paths.

A switch matrix comprises several multi-port RF MEMS switches and an interconnect network for the switches. The switches in the interconnect network are integrated on a single substrate and form a building block for the matrix. Each switch comprises a monolithic structure having at least one of clamped-clamped beams and cantilever beams. The switch has at least two connecting paths.

A multi-port RF MEMS switch comprises a monolithic structure formed on a single substrate. The switch has at least two connecting paths with at least one thermally operated actuator that moves into contact and out of contact with the at least two connecting paths.

A switch matrix comprises several multi-port RF MEMS switches and an interconnect network for the switches. The switches and the interconnect network are integrated on a single substrate. Each switch comprises a monolithic structure having at least one thermally operated actuator that moves into and out of contact with at least two conducting paths.

A method of fabricating a monolithic switch, said method comprising simultaneously forming interconnect lines and MEMS switches on a substrate, selecting a wafer as a base substrate, depositing a metallic film on a back side of said substrate, covering said metallic film with a protective layer, evaporating a resistive layer on a front side of said substrate, depositing a conductive film on said resistive layer, said conductive film being patterned to form a first layer, depositing a dielectric layer on said conductive layer, coating said dielectric layer with a sacrificial layer, forming contact dimples in said sacrificial layer, adding a thick layer of evaporated metal to said sacrificial layer, removing said sacrificial layer and removing said protective layer, forming said switch with at least one of clamped-clamped beams and cantilever beams.

IN THE BRIEF DESCRIPTION OF THE DRAWINGS

FIG. 10A is a schematic view of a switch matrix having a pair wise connection;

FIG. 10B is a schematic prior art view of a large switch matrix;

FIG. 11A is a view of an interconnect network of the present invention having a three by three switch matrix;

FIG. 11B is an enlarged partial side view of the network shown in FIG. 11A;

FIG. 11C is an enlarged partial top view of the network shown in FIG. 11A;

FIG. 11D is an enlarged perspective view of a single vertical transition of the network shown in FIG. 11A;

FIG. 11E is an enlarged perspective view of a double vertical transition of the network shown in FIG. 11A;

FIG. 13A is a schematic top view of a single pole triple throw switch;

FIG. 13B is a schematic top view of a nine by nine switch matrix;

FIG. 14A shows a three by three interconnect network using single coupled and double coupled transitions;

FIG. 14B is a partial perspective view of an electromagnetically couple transition;

FIG. 14C is a partial perspective view of double vertical coupled transitions;

FIG. 15A is a schematic top view of the interconnect network of FIG. 14;

FIG. 15B is a schematic enlarged top view of that part of the network shown in FIG. 15A that is encircled and connected to FIG. 15B by an arrow;

FIG. 15C is a schematic enlarged top view of that part of the network shown in FIG. 15A that is encircled and connected to FIG. 15C by an arrow;

FIG. 15D is a schematic enlarged bottom view of the network shown in FIG. 15A.

FIG. 18A shows a schematic top view of a two to four redundancy building block;

FIG. 18B shows a building block that is composed of four single pole triple throw switches;

FIG. 19A shows a single pole single throw switch:

FIG. 19B shows a schematic view of a thermal actuator of a switch in FIG. 19A, the actuator being in a rest position;

DETAILED DESCRIPTION OF A PREFERRED EMBODIMENT

Figure 1:
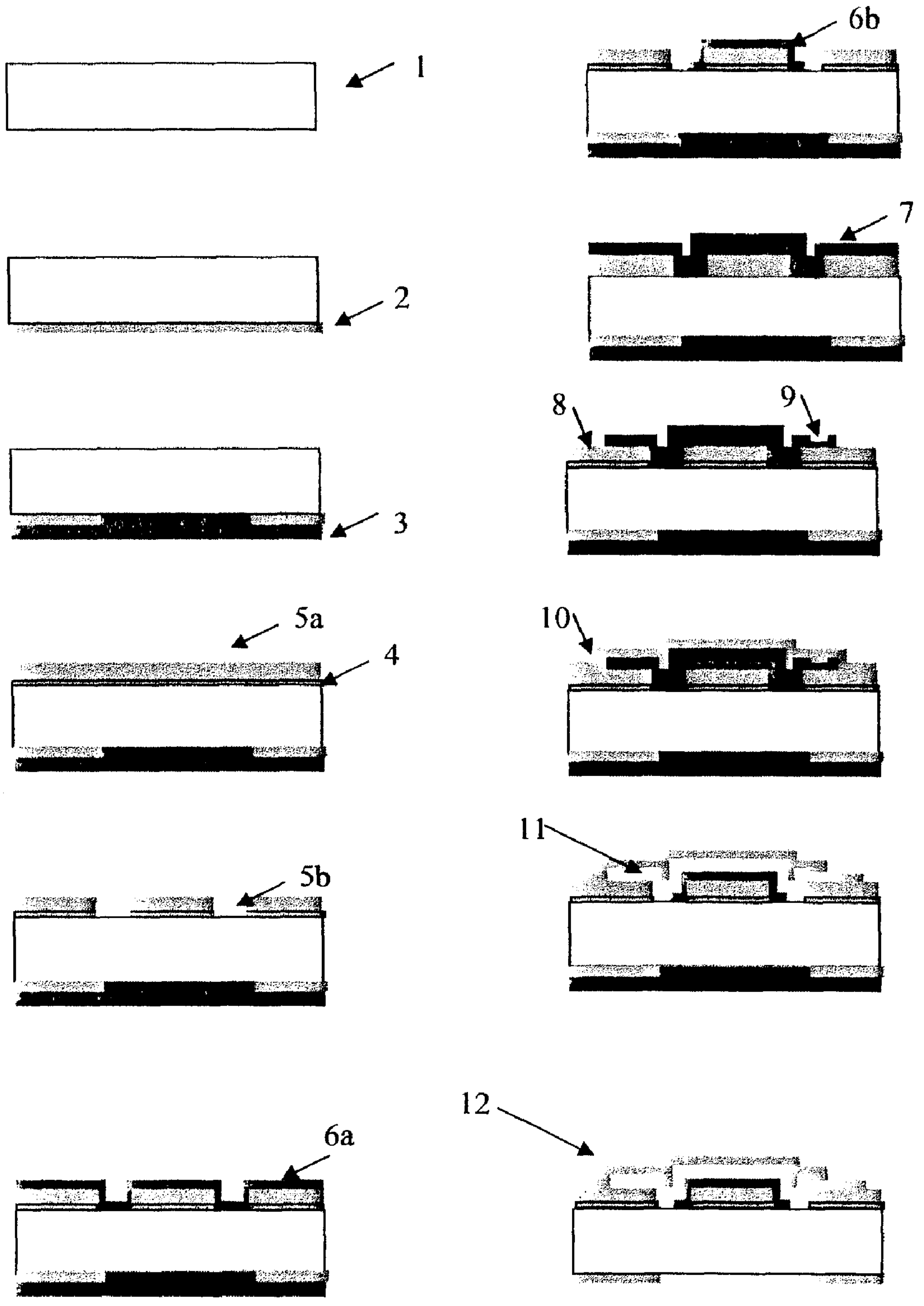
FIG. 1 is schematic view of a progression fabrication system for monolithic switches.

FIG. 1 shows a preferred fabrication process that is used to develop monolithic switches and switch matrices. It is comprised of the simultaneous processing of all the interconnect lines and the MEMS switches within one substrate. An alumina wafer 1 is selected as the base substrate as it exhibits a good RF performance at high frequencies. Initially, a gold film 2 is deposited on the back side of the substrate. This film is patterned for the transitions and crossovers. Afterwards, a back side is covered with a layer of Kapton tape or photoresist 3. The process continues with evaporating a resistive layer 4 for DC biasing as well as adhesion of the following film (gold 5*a*) in the front side. Gold film 5*b* is patterned to form the first layer. White gold is preferred, other metallic films are suitable. The fourth step is the deposition of the dielectric layer 6 (PECVD $SiO_2$ with adhesion layer of TiW). Then a sacrificial layer (photo resist 7) is spin coated. Initially, the resist is fully exposed through the fifth mask to pattern the anchors 8. Then the resist is followed by short exposure of the contact dimples 9 using another mask. The last layer is thick evaporated gold 10 as the structural layer and it is followed by oxygen plasma release which results in released beams 11. Then the protecting layer at the back is removed to have the final device 12.

Figure 2A:
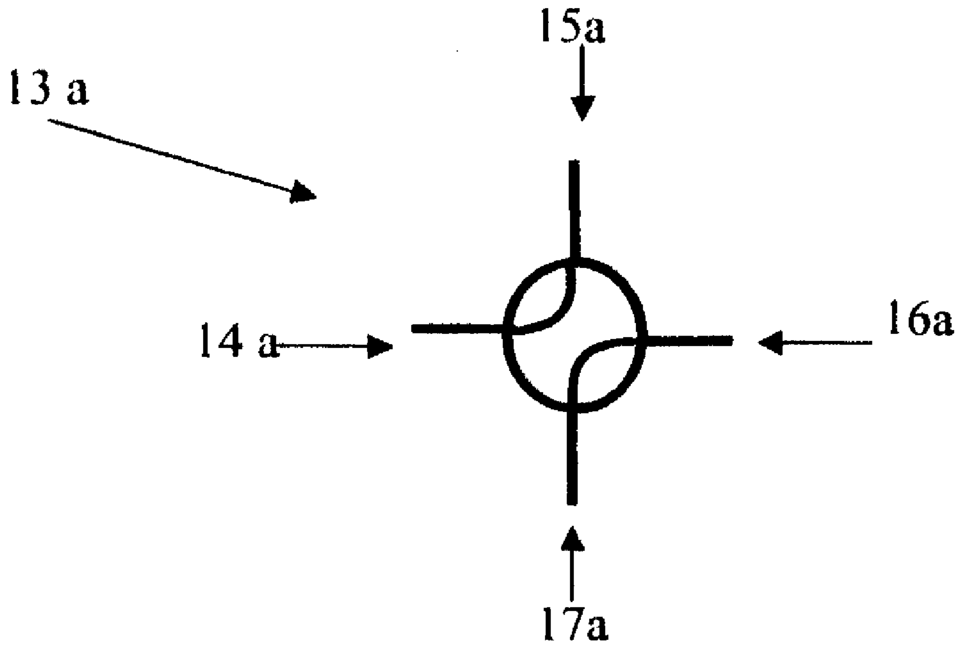
FIG. 2A is a schematic view of a prior art C-switch in a first state.
Figure 2B:
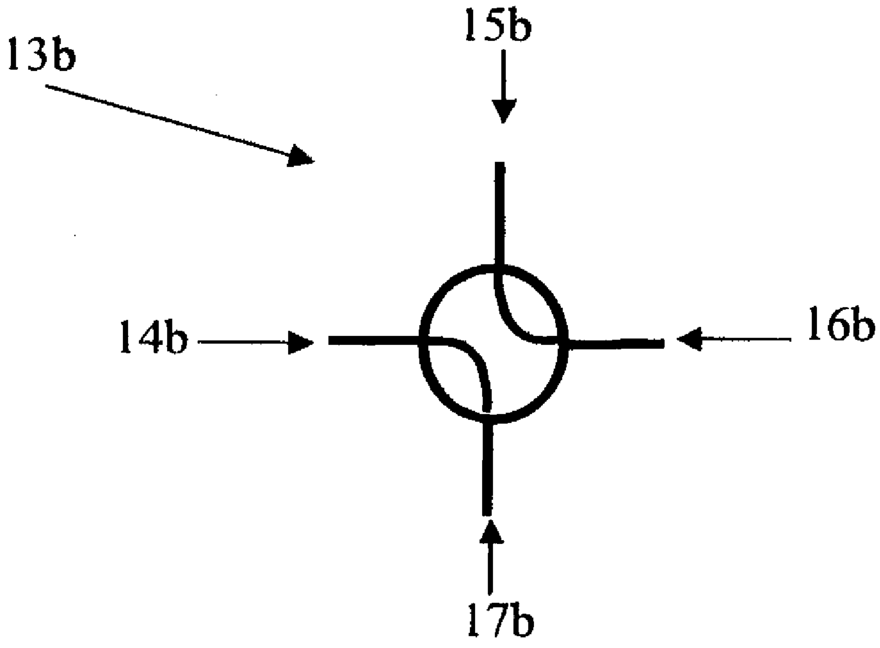
FIG. 2B is a prior art schematic view of a C-switch in a second state.
Figure 3A:
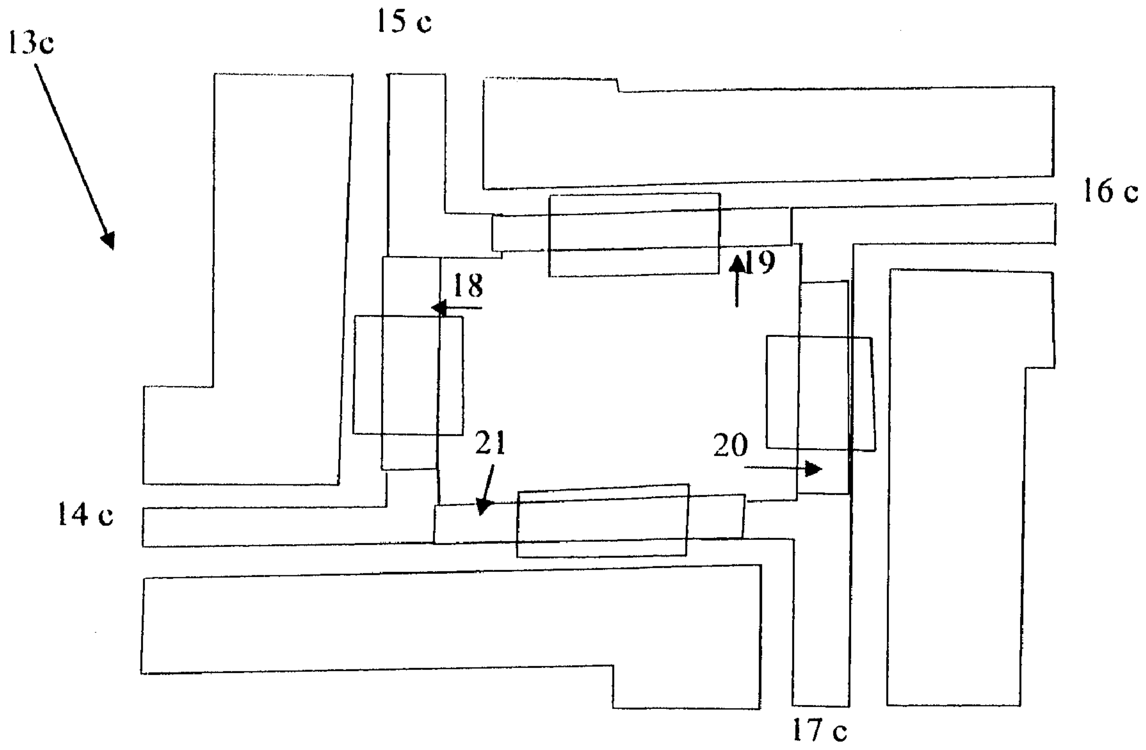
FIG. 3A is a schematic view of a C-switch designed and fabricated in accordance with the process of the present invention.
Figure 3B:
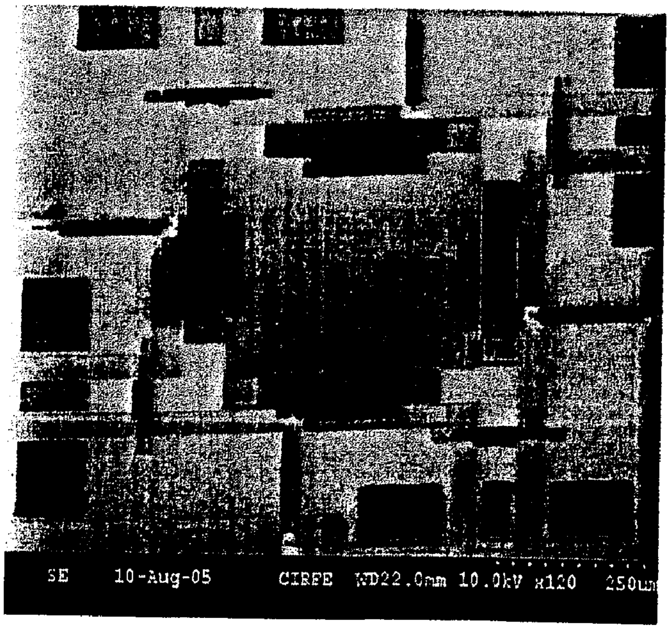
FIG. 3B shows a fabricated C-switch.

FIG. 2 is the operation schematic of a C-type switch. The switch functions in two states. State I (FIG. 2(*a*)) is presented when port 14*a* is connected to port 15*a* and port 16*a* is connected to port 17*a*. State II (FIG. 2(*b*)) is represented when port 14*b* is connected to port 17*b* and port 15*a* is connected to port 16*a*. FIG. 3(*a*) shows the structure of the C-type switch designed and fabricated using the above mentioned process. It is a compact ($750 \times 750\ \mu m^2$) coplanar series switch, consisting of four actuating beams (18,19,20,21). One end of each beam is attached to a 50Ω coplanar transmission line, whereas the other end is suspended on top of another 50Ω coplanar transmission line to form a series-type contact switch. In state I, beams 18 and 20 are in contact mode while for state II, connection is established when beams 19 and 21 is pulled down. FIG. 3(*b*) shows the fabricated preferred embodiment for the present invention.

Figure 4A:
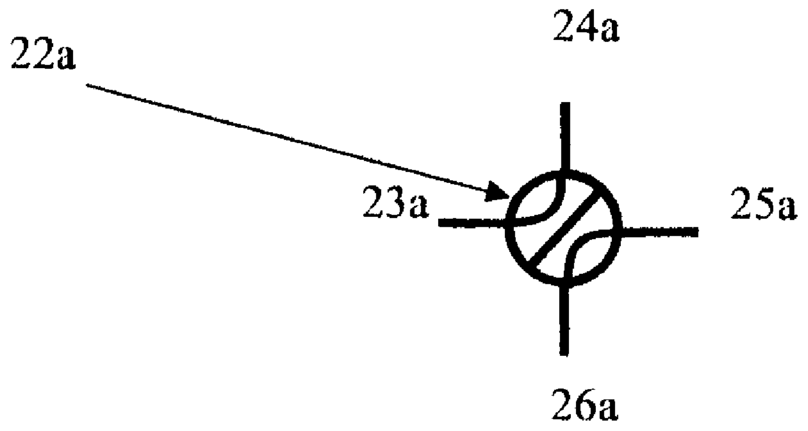
FIG. 4A is a prior art schematic view of an R-switch in a first state.
Figure 4B:
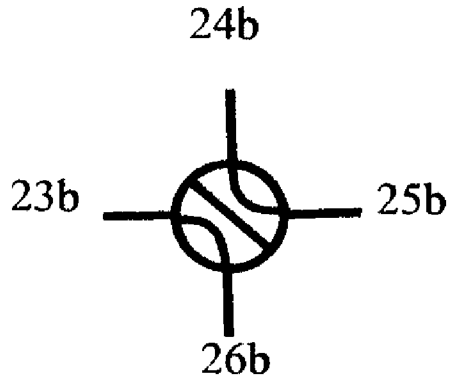
FIG. 4B is a prior art schematic view of an R-switch in a second state.
Figure 4C:
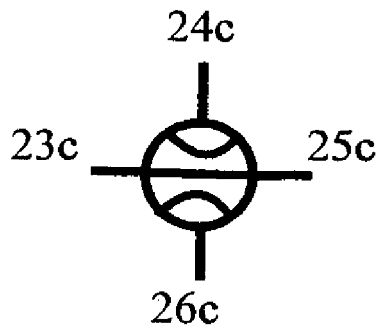
FIG. 4C is a prior art schematic view of an R-switch in a third state.
Figure 5:
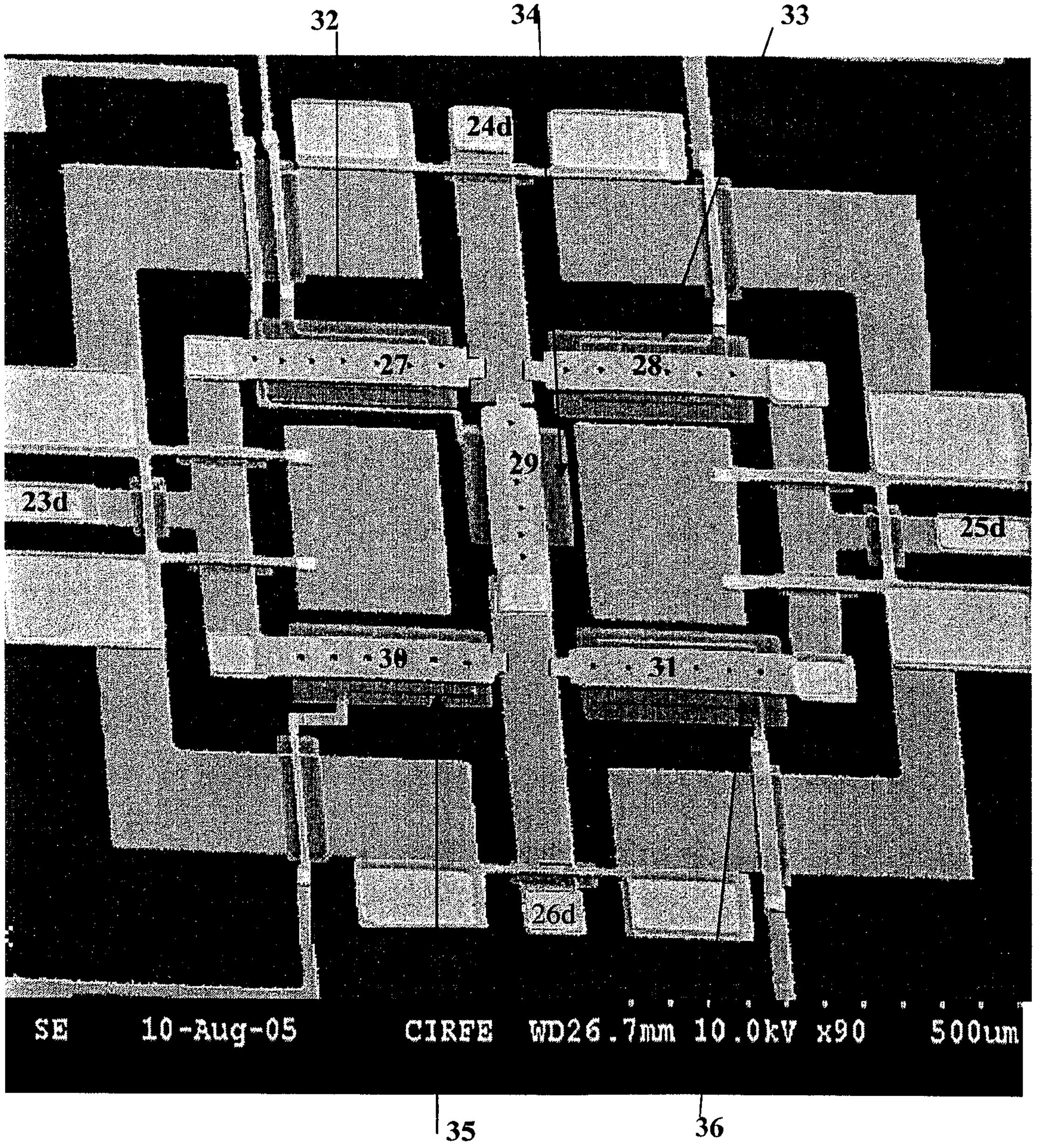
FIG. 5 is a fabricated R switch.

FIG. 4 shows the operational schematic of an R-type switch. In state I, shown in FIG. 4(*a*), ports 23*a* and 24*a*, and ports 25*a* and 26*a*, are connected, while in state II (in FIG. 4(*b*)), ports 23*b* and 26*b*, and ports 24*b* and 25*b*, are connected, and in state III only ports 23*c* and 25*c*, are connected. FIG. 5 shows the fabricated R-type switch using thin film process shown in FIG. 1. It consists of four ports 23*d*, 24*d*, 25*d*, 26*d* and five actuators 27, 28, 29, 30, 31. The additional state of the R-type switch compared to the C-type switch is represented when beam 29 is pulled down and provides a short circuit between ports 24*d*, and 26*d*. It should be noted that there are electrodes 32, 33, 34, 35, 36, 37 under the beams. The R-type switches provide a superior advantage in comparison to the C-type switches as they operate in one more state, which considerably reduces the number of building blocks in redundancy switch matrices and simplifies the overall topology.

Figure 6:
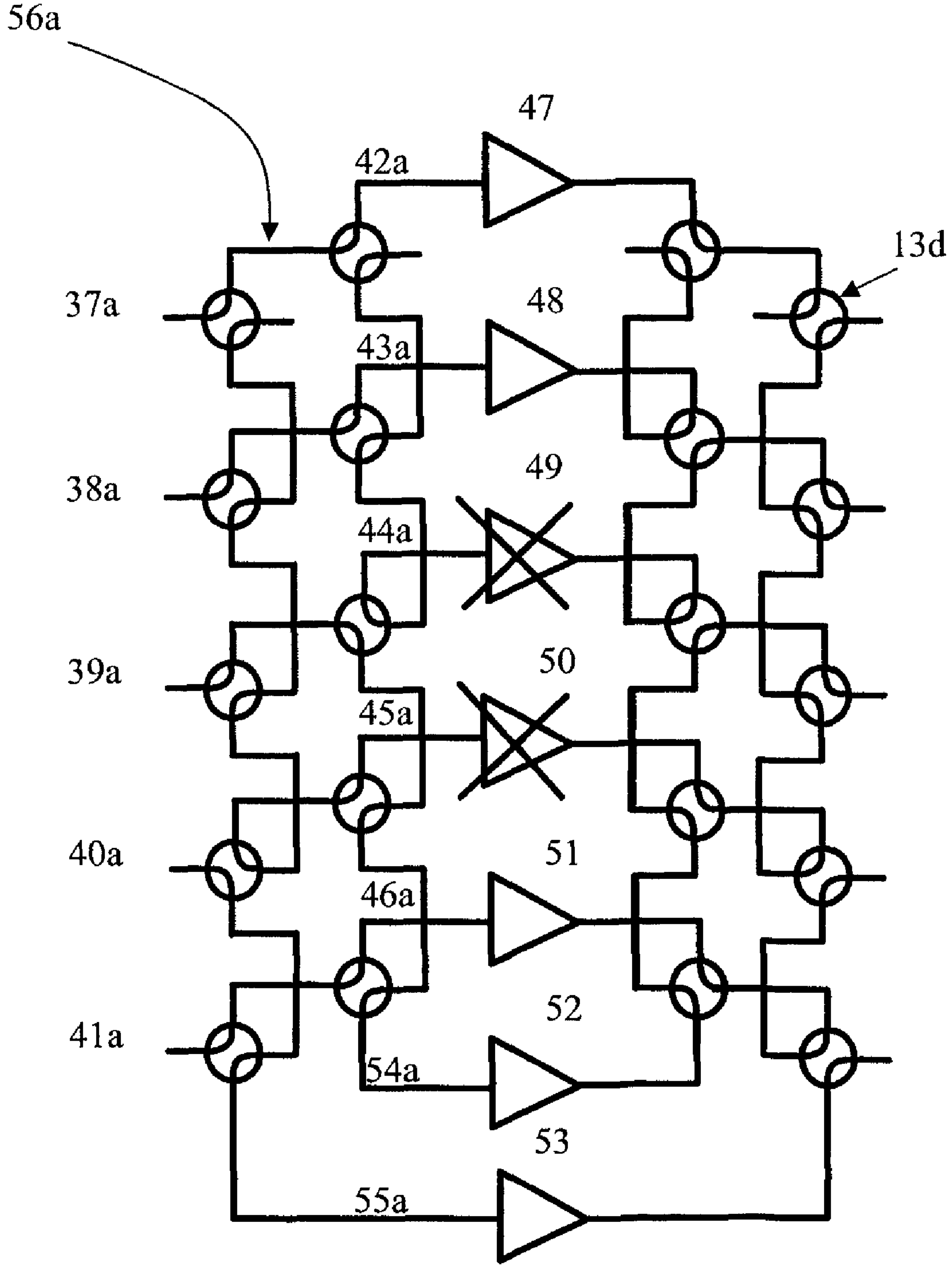
FIG. 6 is a schematic view of a redundancy switch matrix having C-switches.
Figures 7A, 7B, 7C, 7D:
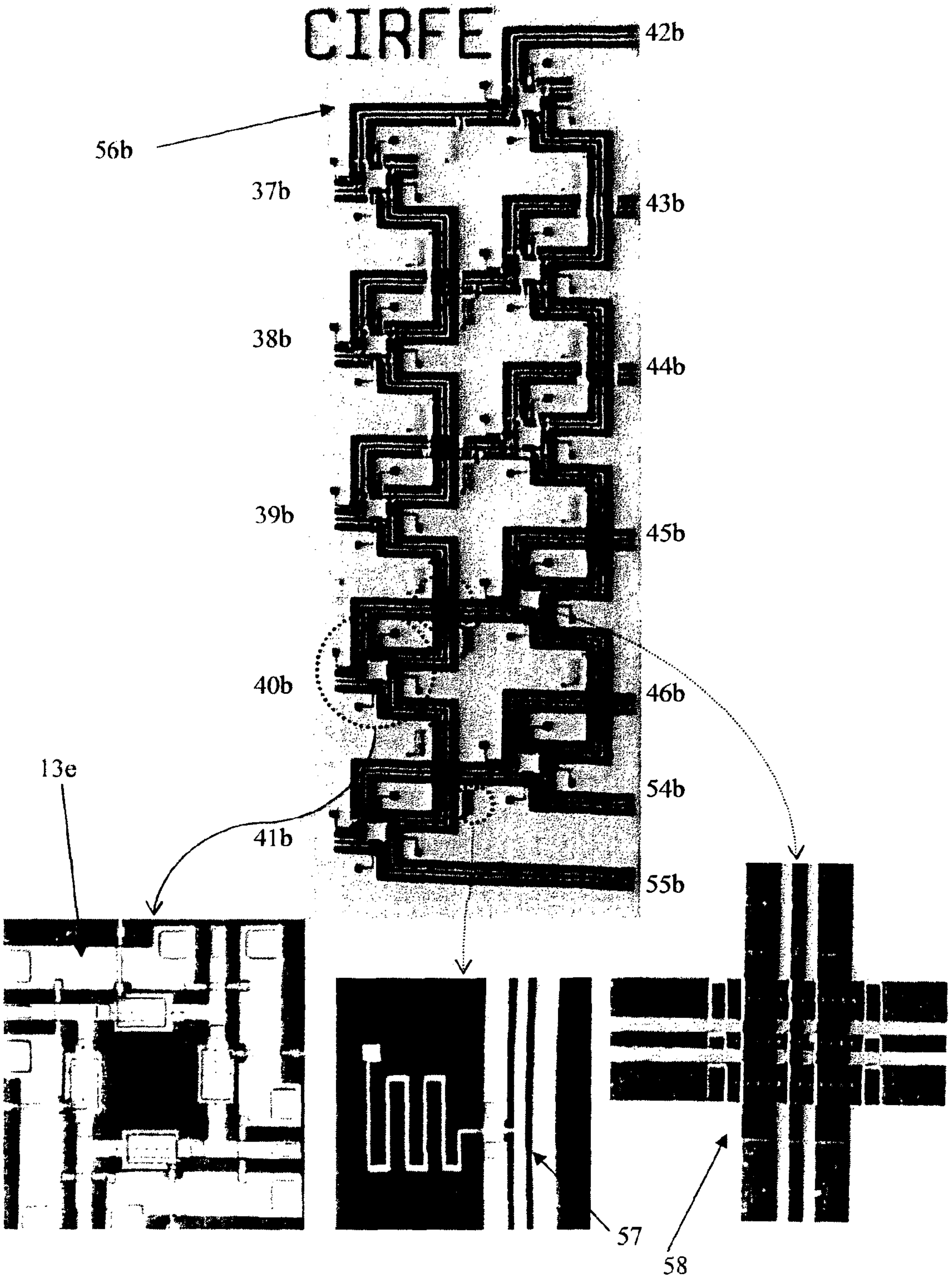
FIG. 7A is a switch matrix having C-switches fabricated in accordance with the present invention.
FIG. 7B is an enlargement of that part of FIG. 7A shown by a dotted circle and arrow to FIG. 7B.
FIG. 7C is an enlargement of that part of FIG. 7A shown by a dotted circle and arrow to FIG. 7C.
FIG. 7D is an enlargement of that part of FIG. 7A shown by a dotted circle and arrow to FIG. 7D.

In a typical satellite payload hundreds of switches, in the form of switch matrices, are used to provide the system redundancy and maintain the full functionality. This is achieved by rerouting the signal to the spare amplifier in case of any failure. The configuration shown in FIG. 6 is a 5 to 7 redundancy switch matrix based on C-type switch 13 basic building blocks. Ports 37*a* to 41*a* is the input ports of the switch matrix 56*a* connected to amplifiers of 47 to 51. In case of any failure in these amplifiers, the switch matrix reroutes the signal in a way that spare amplifiers 52 and 53 are in the circuit and the entire system remains fully functional. Using the process presented in FIG. 1 and based on C-type switches 13 the entire switch matrix is fabricated and the preferred embodiment is shown in FIG. 7 which has 5 input ports (37, 38, 39, 40,41) and 7 output ports (42,43, 44,45, 46, 54, 55). It uses Cr 4 layer as DC biasing lines 57 and air bridges for crossovers 58 in the interconnect lines. Further, switches are constructed to be operated to have a variable functionality. For example, an R-switch can be operated as an R-switch, a C-switch or a single pole double throw switch.

Figure 8:
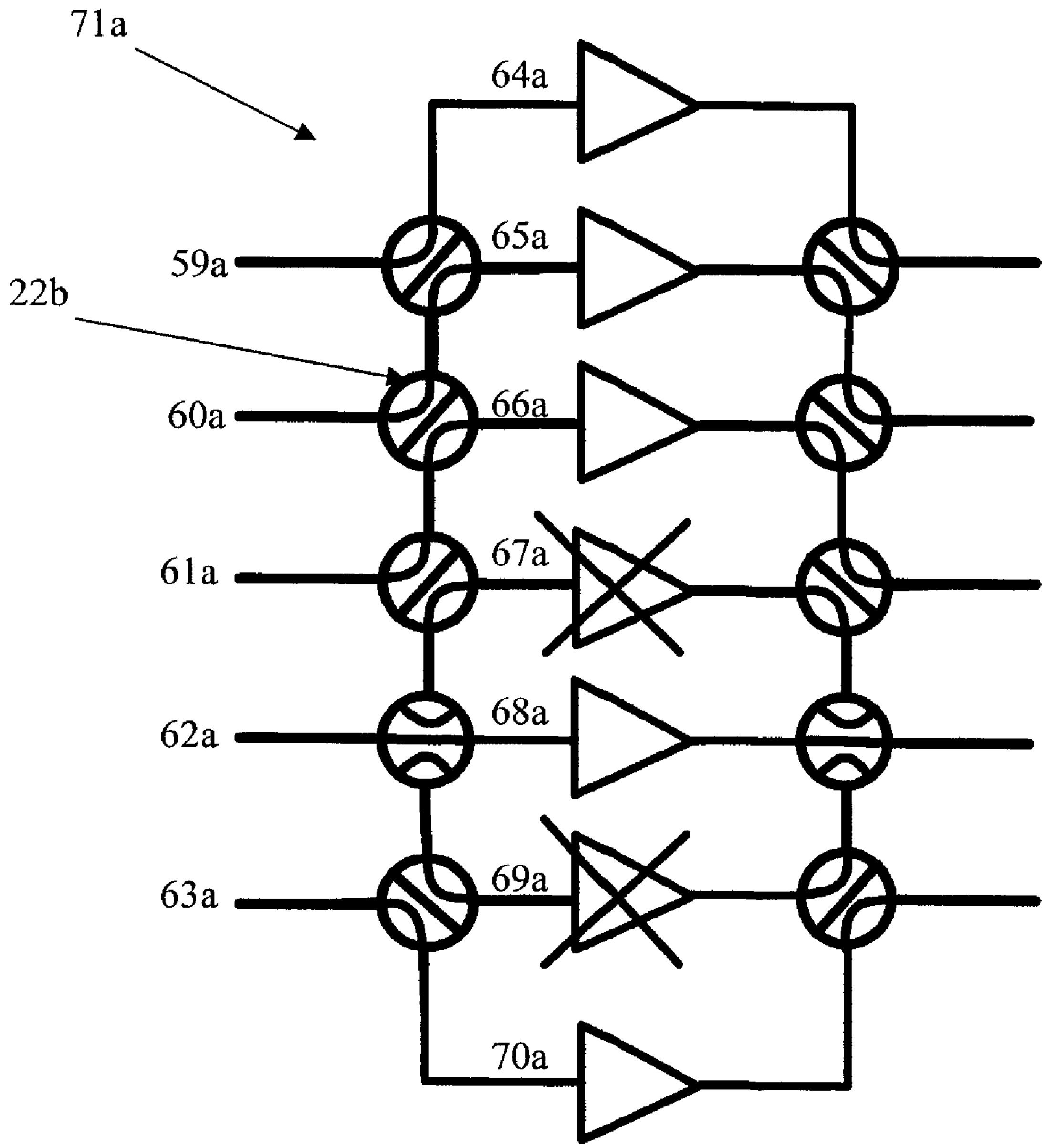
FIG. 8 is a schematic view of a switch matrix of R-switches.
Figure 9:
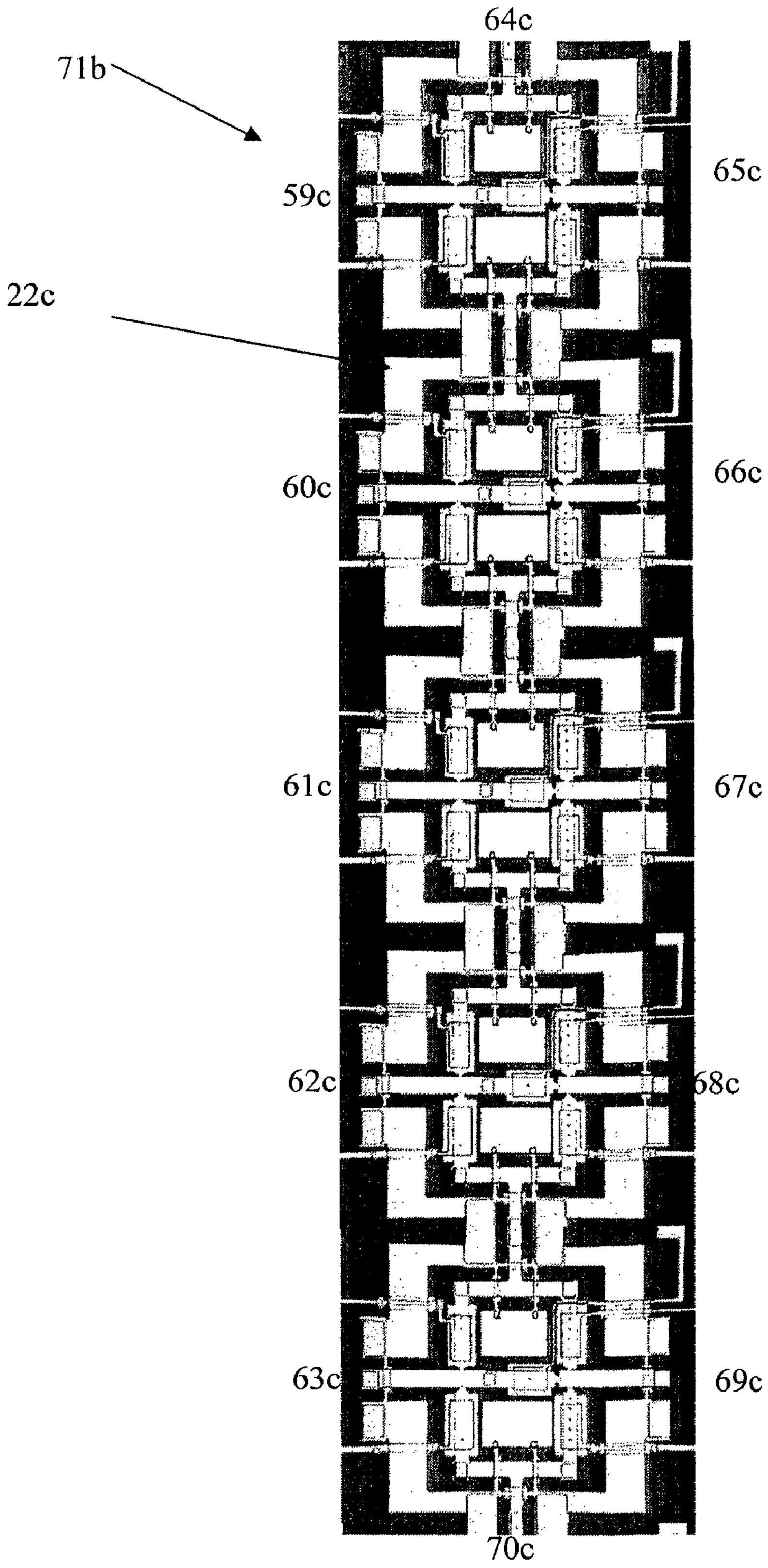
FIG. 9 is a switch matrix of R-switches fabricated in accordance with the present invention.

FIG. 8 shows schematic of an R-type switch matrix 71*a*. This consists of five R-type switches 22*b*. The state that is shown in FIG. 8 is for the case that there are two failures and the switch matrix reroutes the signal to its spare outputs 64*a* and 70*a*. FIG. 9 shows a preferred embodiment for invented R-type switch matrix 71*c*. It has five inputs 59, 60, 61, 62, 63 and seven outputs 64, 65, 66, 67, 68, 69, 70. It can be clearly observed that using R-type switches 22*c*, the switch matrix is much smaller (only five elements 22*c*).

Figure 12:
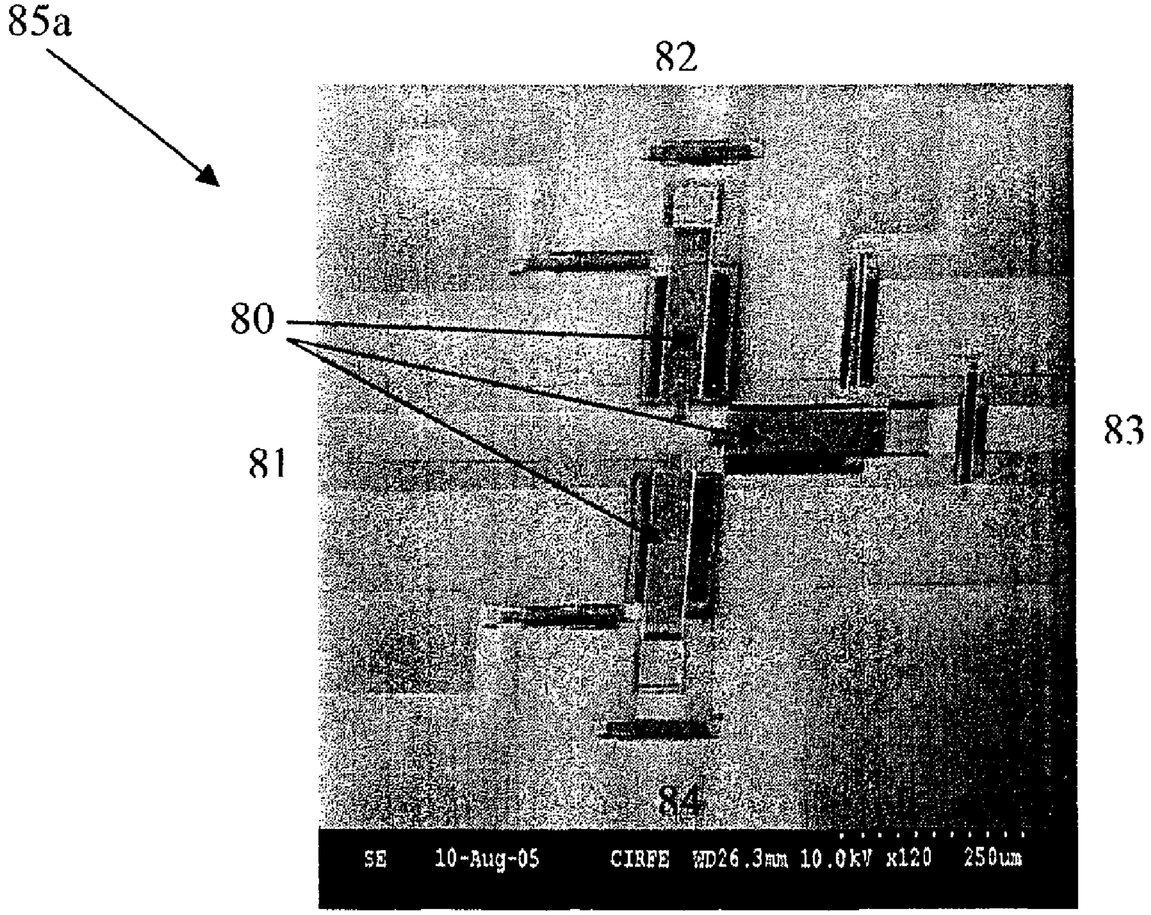
FIG. 12 is a view of a single pole triple throw switch.

FIG. 10(*a*) shows the schematic of another switch matrix 72*a* that has pair wise connection. This type of matrices 72 are used for signal routing and managing the traffic. In RF MEMS switch matrices that are small and dense, the signal transmission and maintaining a good isolation becomes more critical. This problem is even more pronounced for the larger structures such as shown in FIG. 10(*b*) 75. FIG. 11 presents a preferred embodiment for the interconnect network 72*b* of a 3 by 3 switch matrix that makes use of a backside 76 patterning. Single vertical transitions 77*b* and double vertical transitions 79*b* are used to transfer the signal from the top to the bottom side of the wafer. The vertical transitions are preferably conductive vias. A single vertical transition is a single conductive via and a double vertical transition is a double conductive via. The interconnect network can be integrated with multi-port switches to form a switch matrix. For instance, the 3 by 3 interconnect network 72*b* can be integrated by Single Pole Triple Throw switches (SP3T) 85. FIG. 12 shows the preferred structure of this switch. It has four ports 81, 82, 83, and 84 with three beams 80. It could present three states and connect input port of 81 to any output ports of 82, 83, and 84.

The smaller switch matrices can be easily expanded to larger one using different network connectivity such as Clos network 75. FIG. 13(*b*) shows a preferred embodiment of the expanded switch matrix to 9 by 9, 87.

Figure 16A:
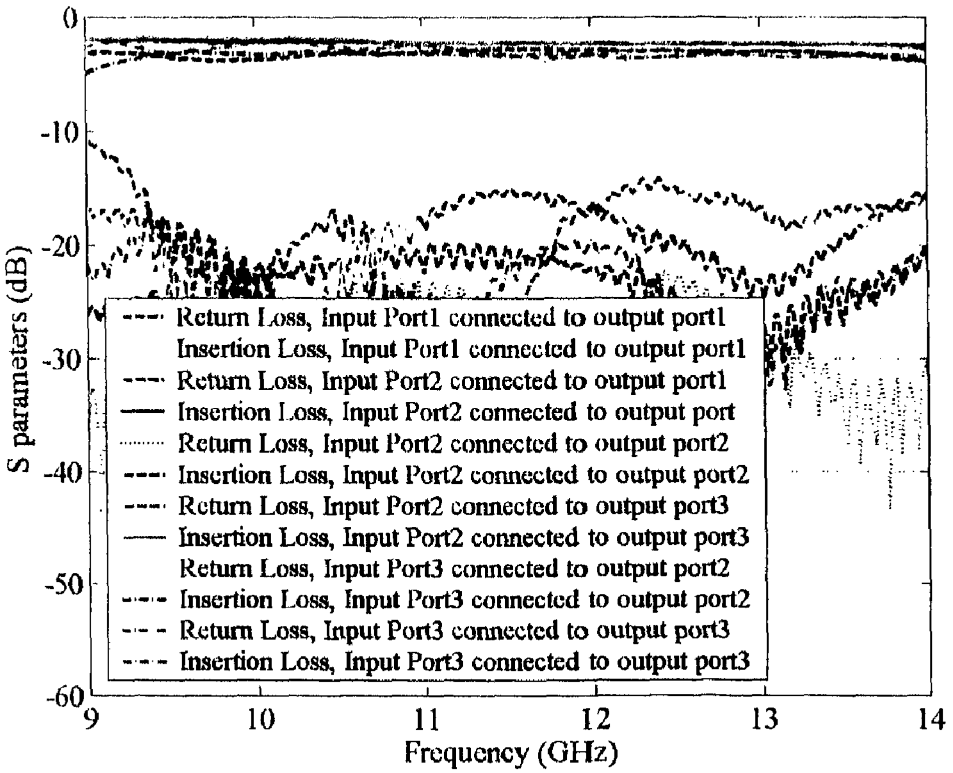
FIG. 16A are the measured results of the structure of FIGS. 14.
Figure 16B:
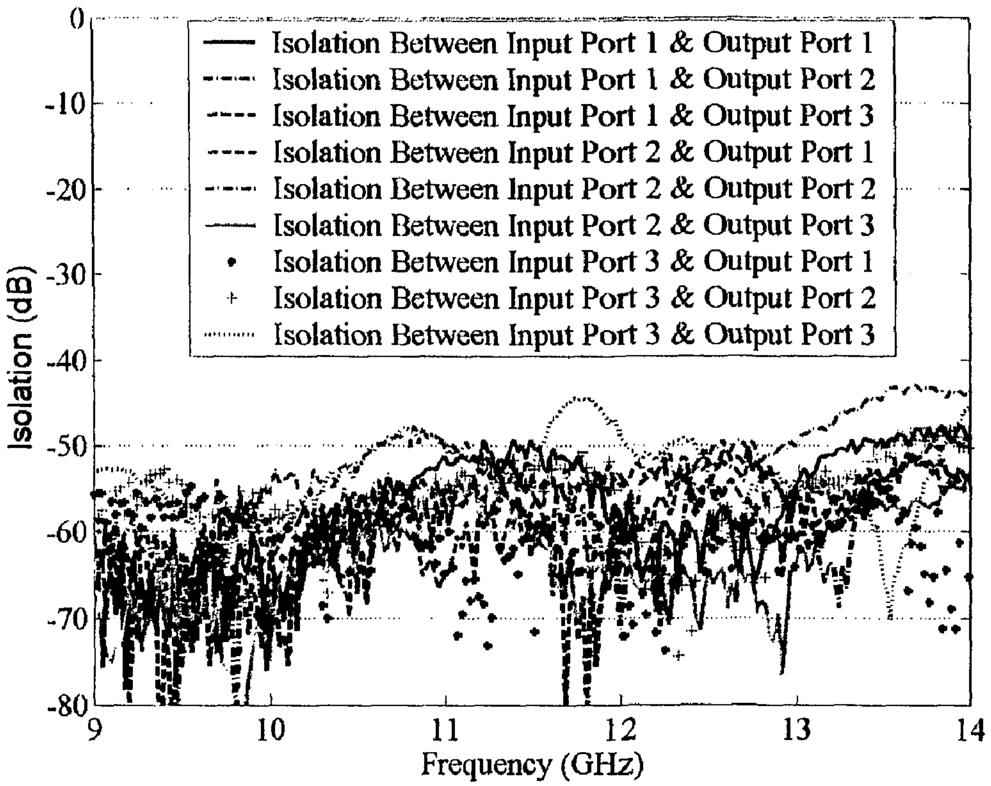
FIG. 16B are the measured results of the structure of the structure of FIG. 15.
Figure 17:
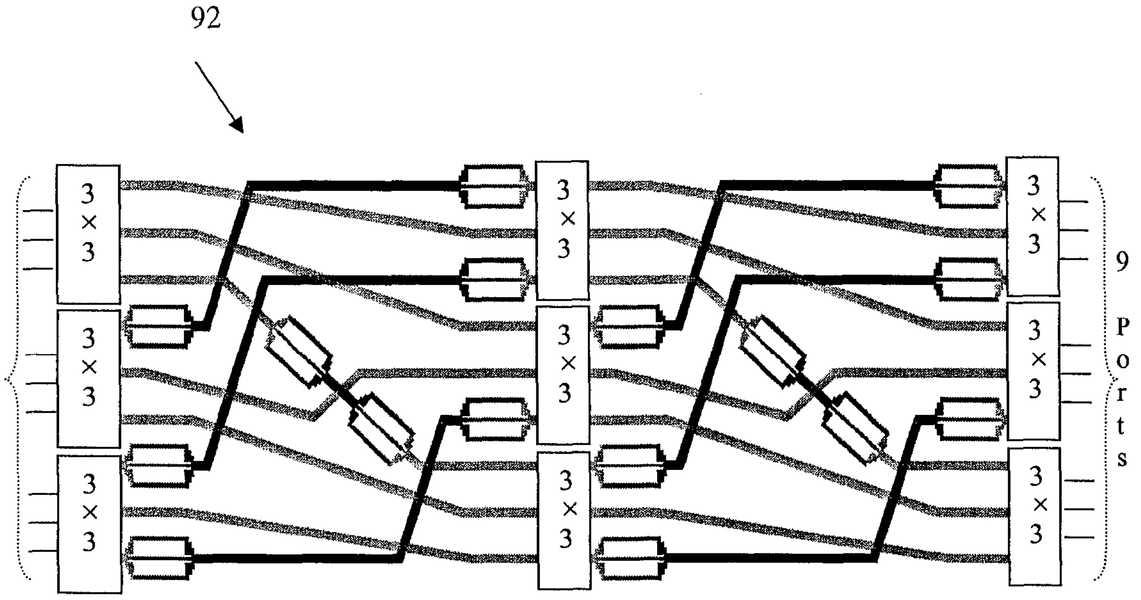
FIG. 17 is a schematic top view of a switch matrix expanded to a 9 by 9 switch matrix.

In addition to via transitions 77*b*, electromagnetically coupled transitions can be also used 89 (a). In this case, the signal in electromagnetically coupled from one side 76 of the substrate to the other side 78. FIG. 14 shows the preferred embodiment of the present invention for 3 by 3 interconnect network 88 using single coupled transition 89 and double vertical coupled transitions 90. This is limited in bandwidth but it requires much simpler fabrication process. It is due to the fact that it avoids using vertical vias. This network can be simply integrated with SP3T switches 85*c* and form a switch matrix 91 as shown in FIG. 15. The measured results of such a structure indicates excellent performance as presented in FIG. 16. FIG. 17 shows the expanded version of the present invention 92 in the form of a 9 by 9 switch matrix.

FIGS. 18(*a*) and (*b*) show another preferred embodiment 99*a* that is a small switch matrix or a type of multi-port switch with a special function such as 2 to 4 or 3 to 4 redundancy. The structure shown in FIG. 18(*a*) 99*a*, represents a 2 to 4 redundancy building block. In normal operation, input ports, 95 and 96, are connected to the main amplifiers, 93 and 94. In case of failure of one of the main amplifiers, that port can be switched to the spare amplifiers 97 and 98. FIG. 18(*b*) shows another building block 99*b* that is composed of the same structure (four SP3T switches 85*d*). This structure 99*b* can be used for 3 to 4 redundancy purposes using one spare amplifier. There are three input ports 103, 104, 105 that are connected to three main amplifiers 100, 101, 102 during the normal operation. In the case of amplifier failure, any of the input ports can be switched to the spare amplifier 106 to maintain the full functionality of the system.

Figure 19C:
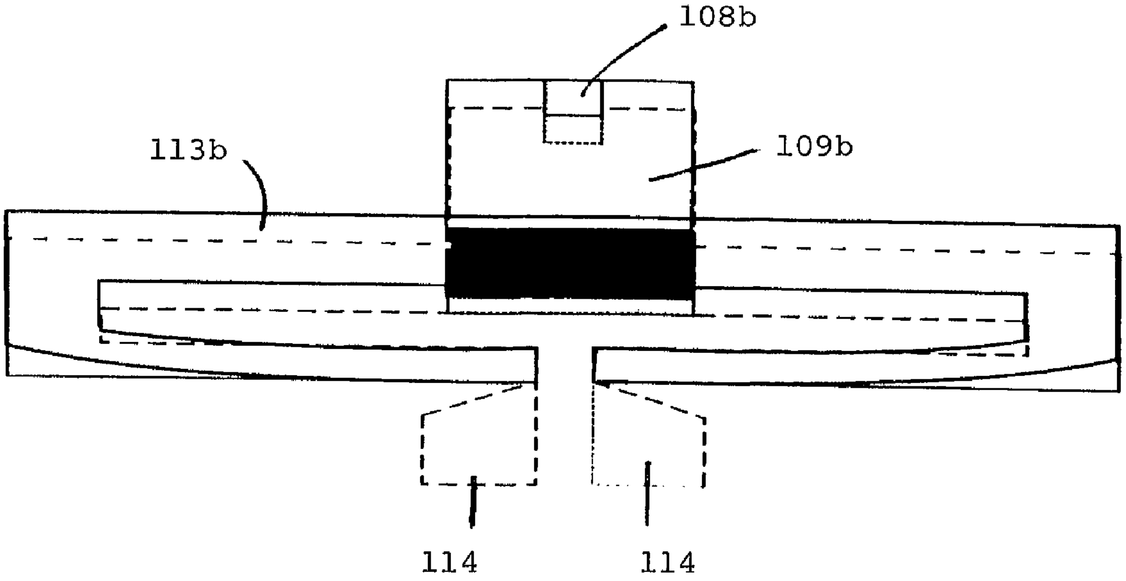
FIG. 19C shows a schematic top view of the actuator in an expanded position with the rest position superimposed thereon in dotted lines.

FIGS. 19(*a*), (*b*) and (*c*) present another embodiment 107 of the present invention of switch that uses thermal actuators 113 to turn the switch ON and OFF. The actuator uses two thin and thick arms and different thermal expansion of the arms provides a forward movement and switching. The switch uses a dielectric layer 109 to separate the contact metal 108 with the actuator providing much better RF performance.

FIGS. 19(*b*) and 19(*c*) are schematic views of the thermal actuator of FIG. 19(*a*). FIG. 19(*b*) shows the actuator in the rest position and FIG. 19(*c*) shows the actuator in the expanded or actuated position with the rest position superimposed thereon by dotted lines. The same reference numerals are used in FIG. 19(*c*) as those used in FIG. 19(*b*).

Figure 20:
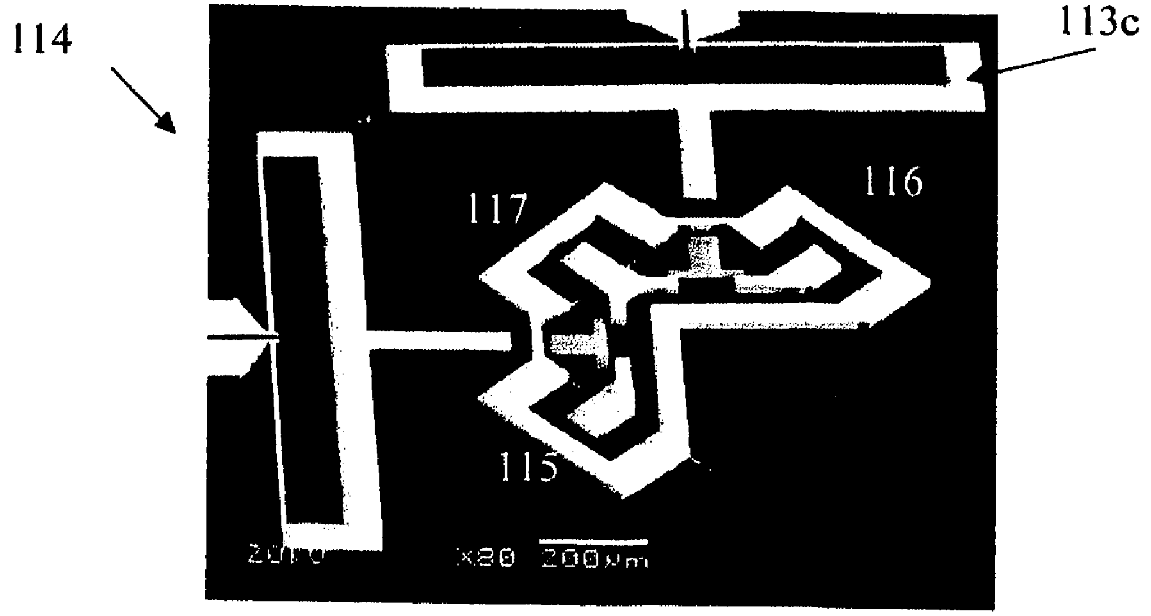
FIG. 20 is a perspective view of a single pole double throw switch having thermally operated actuators.
Figure 21:
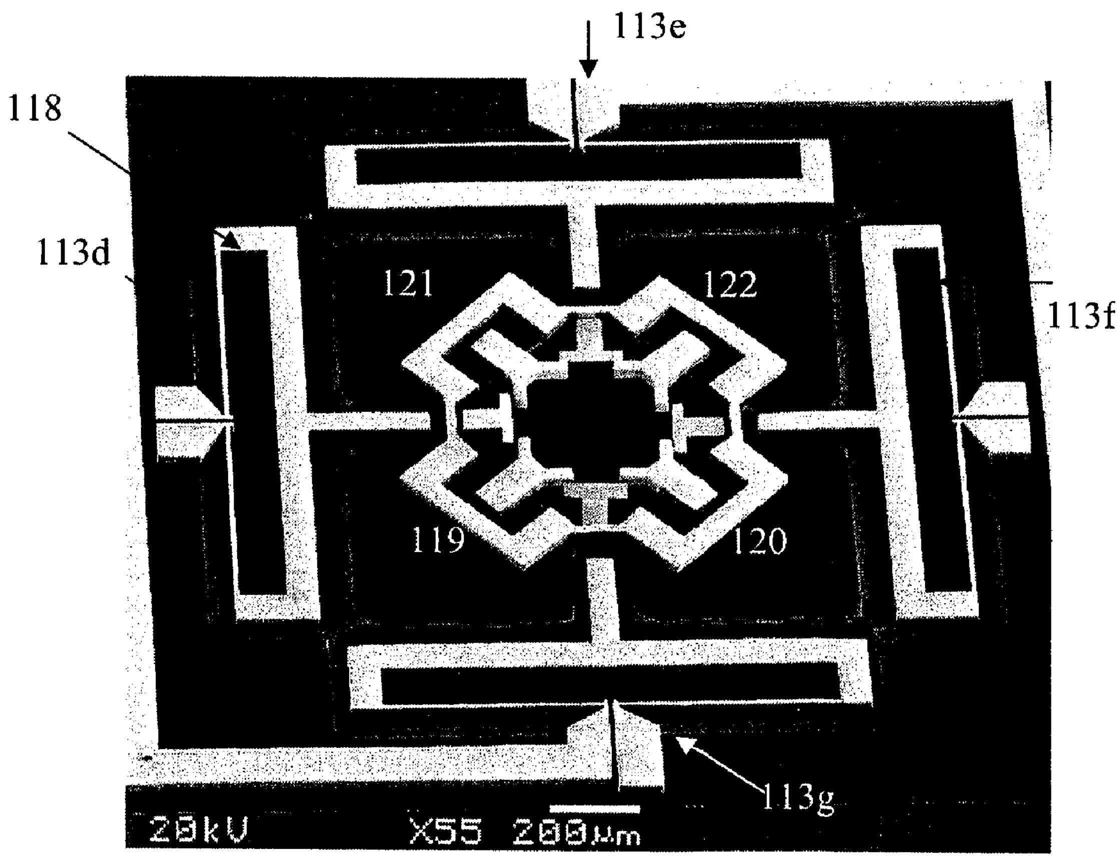
FIG. 21 is a perspective view of a C-switch having thermal actuators.

An SP2T switch 141 is presented in FIG. 20. FIG. 21 presents a C-type switch 118 developed using this concept. Actuators 113*d* and 113*f* move forward to provide connection between ports 121 to 119 and 122 to 120. For the other operating state, the actuators 113*e* and 113*g* move forward and make connection between ports 121 to 122 and 119 to 120.

Figure 22:
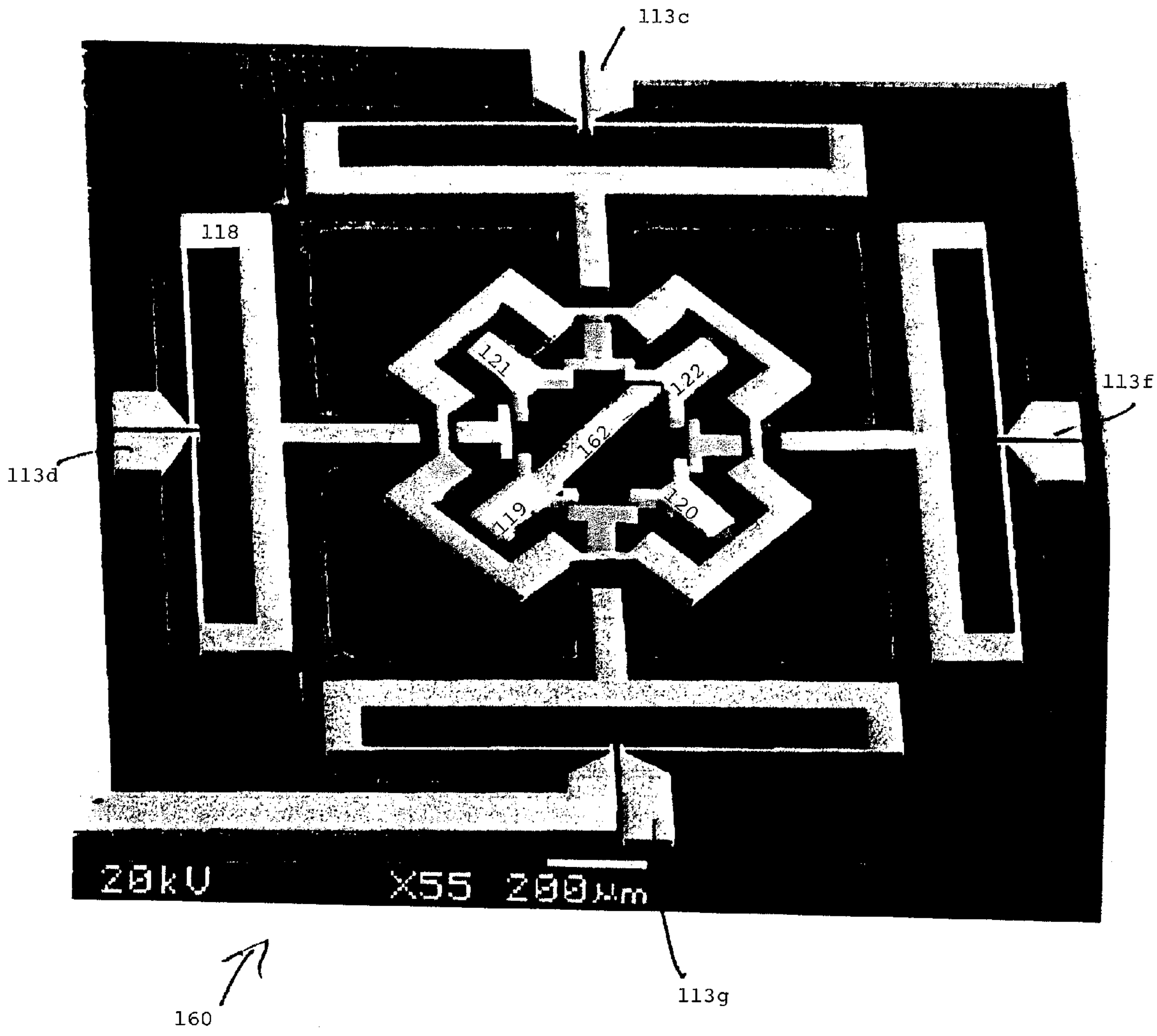
FIG. 22 is a perspective view of an R-switch with a combination of thermal actuators and electrostatic actuators.

FIG. 22 is an R-switch 160. The same reference numerals are used in FIG. 22 as those used in FIG. 21 for those components that are identical. The R-switch 160 has four thermal actuators 113*d*, 113*e*, 113*f*, and 113*g* as well as one electrostatic cantilever actuator 162 that connects port 119 and port 122 when the thermal actuators are in the rest position and the electrostatic actuator 162 is activated. The electrostatic actuator 162 can be placed with another type of actuator. For example, the electrostatic actuator can be replaced by a thermal actuator.

We claim:

1. A multi-port RF MEMS switch, said switch comprising a monolithic structure formed on a single substrate, said switch having at least one of clamped- clamped beams and cantilever beams, said switch being planar and having at least three states, in at least two of said states, said switch having at least two connecting paths connected simultaneously.

2. A switch matrix comprising several multi-port RF MEMS switches and an interconnect network for said switches, said switches and said interconnect network being integrated as a monolithic structure on a single substrate and forming a building block for said matrix, each switch comprising a monolithic structure having at least one of clamped-clamped beams and cantilever beams, said switch being planar and having at least three states, in at least two of said states, said switch having at least two connecting paths that are connected simultaneously in at least one state, said interconnect network being either planar or bi-planar.

3. A method of fabricating a monolithic switch matrix, switches with at least three states, in at least two of said states, said switches with three states having at least two connecting paths that are connected simultaneously in at least one state said method comprising simultaneously forming interconnect lines with crossovers and MEMS switches On a substrate, selecting a wafer as a base substrate, depositing a metallic film on a back side of said substrate, covering said metallic film with a protective layer, depositing a conductive film on a front side of said substrate, said conductive film being patterned to form a first layer, depositing a dielectric layer on said conductive layer, coating said dielectric layer with a sacrificial layer, forming contact dimples in said sacrificial layer, adding a thick layer of evaporated metal to said sacrificial layer, removing said sacrificial layer and removing said protective layer, forming said switch with at least one of clamped-clamped beams and cantilever beams.

4. A multi-port RF MEMS switch, said switch comprising a monolithic structure formed on a single substrate, said switch having at least three states, in at least two of said states, at least two connecting paths in at least one state that are connected simultaneously, said at least two connecting paths sharing at least one thermally operated actuator that moves laterally into and out of contact with said at least two connecting paths.

5. A switch as claimed in claim 4 wherein said at least one thermal actuator is connected to a dielectric layer, said dielectric layer connecting to another metal.

6. A multi-port RF MEMS switch as claimed in claim 5, said switch comprising a monolithic structure formed on a single substrate, said switch having at least on of clamped-clamped beams and cantilever beams, said switch being planar.

7. A switch as claimed in claim 4 wherein said at least one thermally operated actuator is at least two thermally operated actuators that move laterally into and out of contact with said at least two connecting paths.

8. A switch matrix comprising several multi-port RF MEMS switches and an interconnect network for said switches, said switches and said interconnect network being integrated on a single substrate, each switch comprising a monolithic structure having at least one thermally operated actuator that moves into and out of contact with said at least two connecting paths that are connected simultaneously, each switch being planar having at least three states, said interconnect network being either planar or bi-planar, said actuator being connected to a dielectric layer, said dielectric layer being connected to another metal, in at least two of said states said metal connecting two signal paths simultaneously in at least one state of said switch.

9. A switch as claimed in claim 1 wherein said switch is an R-switch, said R-switch having five connecting paths artd five actuators.

10. A switch as claimed in claim 1 wherein said switch has one or more actuators selected from the group of thermal, magnetic, electrostatic and a combination thereof.

11. A switch as claimed in claim 1 wherein said switch has one or more electrostatic-actuators.

12. A switch matrix as claimed in claim 2 wherein said interconnect network has ports that are located on one side of said substrate.

13. A switch matrix as claimed in claim 2 wherein said interconnect network has ports that are located on-two sides of said substrate.

14. A switch matrix as claimed in claim 2 wherein said interconnect network has at least one crossover.

15. A switch matrix as claimed in claim 14 wherein said crossover has at least one of air bridges, conductive connectors and capacitative connectors.

16. A switch matrix as claimed in claim 2 wherein there are several switch matrices as building blocks that are interconnected by an interconnect network.

17. A switch matrix as claimed in claim 2 wherein there are several switch matrices that are constructed to provide redundancy and maintain full functionality of a system by being connected to reroute a signal to a spare amplifier in case of failure.

18. A switch matrix as claimed in claim 2 wherein said switches are C-switches.

19. A switch matrix as claimed in claim 2 wherein said switches are R-switches.

20. A switch matrix as claimed in claim 2 wherein said switches and interconnect network are stripline or microstripline.

21. A switch matrix as claimed in claim 2 wherein said matrix is constructed to have a variable functionality.

22. A Switch matrix as claimed in claim 2 constructed to provide redundancy in the event of failure of part of the matrix.

23. A switch as claimed in claim 1 wherein said switch is an R-switch having ports 1, 2, 3 and 4, said switch having three states, one state occurring when ports 1 and 2 and ports 3 and 4 are connected, another state occurring when ports 1 and 3 and ports 2 and 4 are connected and a third state occurring when ports 1 and 4 are connected.

* * * * *